United States Patent
Mackie et al.

(10) Patent No.: US 12,250,147 B2
(45) Date of Patent: *Mar. 11, 2025

(54) SCALABLE MULTI-TENANT UNDERLAY NETWORK SUPPORTING MULTI-TENANT OVERLAY NETWORK

(71) Applicant: Juniper Networks, Inc., Sunnyvale, CA (US)

(72) Inventors: William Stuart Mackie, Carmel, NY (US); Marcel Wiget, Zug (CH)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/343,935

(22) Filed: Jun. 29, 2023

(65) Prior Publication Data

US 2023/0344759 A1    Oct. 26, 2023

Related U.S. Application Data

(63) Continuation of application No. 17/301,288, filed on Mar. 30, 2021, now Pat. No. 11,736,396, which is a
(Continued)

(51) Int. Cl.
*H04L 45/64* (2022.01)
*H04L 12/46* (2006.01)
(Continued)

(52) U.S. Cl.
CPC .......... *H04L 45/64* (2013.01); *H04L 12/4641* (2013.01); *H04L 41/12* (2013.01);
(Continued)

(58) Field of Classification Search
CPC ....................................................... H04L 45/64
See application file for complete search history.

(56) References Cited

U.S. PATENT DOCUMENTS

| 9,571,394 B1 | 2/2017 | Sivaramakrishnan et al. |
| 9,912,582 B2 | 3/2018 | Pourzandi et al. |

(Continued)

FOREIGN PATENT DOCUMENTS

| CA | 3207315 A1 | 3/2018 |
| CN | 105224385 A | 1/2016 |

(Continued)

OTHER PUBLICATIONS

First Examination Report, and Translation Thereof, from Counterpart Chinese Application No. 202210858421.2 dated Jul. 28, 2023, 18 pp.

(Continued)

*Primary Examiner* — Jason E Mattis
(74) *Attorney, Agent, or Firm* — Shumaker & Sieffert, P.A.

(57) ABSTRACT

Techniques are disclosed for scalable virtualization of tenants and subtenants on a virtualized computing infrastructure. In one example, a first controller for the virtualized computing infrastructure configures underlay network segments in the virtualized computing infrastructure by configuring respective Virtual Extensible Local Area Network (VXLAN) segments of a plurality of VXLAN segments of a VXLAN in a switch fabric comprising network switches. Each VXLAN segment provides underlay network connectivity among a different subset of host computing devices of the virtualized computing infrastructure to enable orchestration of multiple tenants in the VXLAN. A second controller for a first subset of the host computing devices has underlay network connectivity through operation of a first VXLAN segment. The second controller configures overlay networks in the first subset of the host computing devices to enable orchestration of multiple subtenants in the first subset of the host computing devices.

20 Claims, 22 Drawing Sheets

Related U.S. Application Data continuation of application No. 16/370,091, filed on Mar. 29, 2019, now Pat. No. 10,972,386.

(51) Int. Cl.
  *H04L 41/12* (2022.01)
  *H04L 45/586* (2022.01)
  *H04L 49/25* (2022.01)
  *H04L 49/354* (2022.01)
  *H04L 61/256* (2022.01)

(52) U.S. Cl.
  CPC .......... *H04L 45/586* (2013.01); *H04L 49/252* (2013.01); *H04L 49/354* (2013.01); *H04L 61/256* (2013.01)

(56) References Cited

U.S. PATENT DOCUMENTS

| | | | |
|---|---|---|---|
| 9,948,579 | B1 | 4/2018 | Sivaramakrishnan |
| 10,009,443 | B1 | 6/2018 | Guigli |
| 10,972,386 | B2 * | 4/2021 | Mackie .................. H04L 45/64 |
| 11,316,822 | B1 * | 4/2022 | Gawade .............. H04L 61/5061 |
| 11,736,396 | B2 * | 8/2023 | Mackie .............. H04L 12/4633 370/254 |
| 2013/0329548 | A1 | 12/2013 | Nakil et al. |
| 2013/0332577 | A1 | 12/2013 | Nakil et al. |
| 2014/0064283 | A1 | 3/2014 | Balus et al. |
| 2014/0233569 | A1 | 8/2014 | Yong et al. |
| 2014/0372582 | A1 * | 12/2014 | Ghanwani ............. H04L 45/745 709/223 |
| 2015/0156118 | A1 | 6/2015 | Madani et al. |
| 2015/0304117 | A1 | 10/2015 | Dong et al. |
| 2016/0105393 | A1 | 4/2016 | Thakkar et al. |
| 2016/0134528 | A1 | 5/2016 | Lin et al. |
| 2016/0188527 | A1 | 6/2016 | Cherian et al. |
| 2017/0346736 | A1 | 11/2017 | Chander et al. |
| 2018/0131605 | A1 | 5/2018 | Jain |
| 2018/0173557 | A1 | 6/2018 | Nakil et al. |
| 2018/0254981 | A1 | 9/2018 | Babu et al. |
| 2019/0042325 | A1 * | 2/2019 | Nair .................... G06F 11/3409 |
| 2019/0068493 | A1 | 2/2019 | Ram et al. |
| 2020/0036624 | A1 | 1/2020 | Michael et al. |
| 2021/0218672 | A1 | 7/2021 | Mackie et al. |

FOREIGN PATENT DOCUMENTS

| | | |
|---|---|---|
| CN | 108540381 A | 9/2018 |
| WO | 20131848846 A1 | 12/2013 |
| WO | 2016063267 A1 | 4/2016 |
| WO | 2018044341 A1 | 3/2018 |

OTHER PUBLICATIONS

"Cisco Programmable Fabric with VXLAN BGP EVPN Configuration Guide," Multi-Tenancy, Jan. 28, 2019, 18 pp.

"Configuring VXLANs," Cisco Nexus, Sep. 18, 2018, 20 pp.

"Deploy a VXLAN Network with an MP-BGP EVPN Control Plane," Cisco, Jun. 2015, 17 pp.

Communication pursuant to Article 94(3) EPC from counterpart European Application No. 19181482.1 dated Aug. 5, 2022, 9 pp.

Extended Search Report from counterpart European Application No. 19181482.1, dated Jan. 16, 2020, 9 pp.

Fekih Ahmed, "Towards Flexible, Scalable and Autonomic Virtual Tenant Slices," Montreal, Jan. 28, 2014, 170 pp.

First Office Action and Search Report, and translation thereof, from counterpart Chinese Application No. 201910923130.5, dated Jul. 19, 2021, 17 pp.

Prosecution History for U.S. Appl. No. 16/370,091, dated Jul. 17, 2020 to Dec. 9, 2020, 25 pp.

Prosecution History from U.S. Appl. No. 17/301,288, dated Apr. 21, 2021 through Apr. 3, 2023, 26 pp.

Response to Communication pursuant to Article 94(3) EPC dated Aug. 5, 2022, from counterpart European Application No. 19181482.1 filed Dec. 5, 2022, 16 pp.

Response to Extended Search Report from counterpart European Application No. 19181482.1, filed Mar. 29, 2021, 4 pp.

Notice of Intent to Grant, and translation thereof, from counterpart Chinese Application No. 202210858421.2 dated Feb. 28, 2024, 6 pp.

"Contrail Architecture," White Paper, Juniper Networks, Dec. 31, 2015, 44 pp.

Summons to Attend Oral Proceedings Pursuant to Rule 115(1) EPC from counterpart European Application No. 19181482.1 dated Apr. 19, 2024, 12 pp.

Extended Search Report from counterpart European Application No. 24194951.0 dated Dec. 11, 2024, 12 pp.

Juniper Networks, "Contrail Architecture", White Papers, Juniper Networks, Inc., Sep. 2015, 44 pp.

\* cited by examiner

SCALABLE MULTI-TENANT UNDERLAY NETWORK SUPPORTING MULTI-TENANT OVERLAY NETWORK

This application is a continuation of U.S. patent application Ser. No. 17/301,288, filed Mar. 30, 2021, which is a continuation of U.S. patent application Ser. No. 16/370,091, filed Mar. 29, 2019, the entire content of each application is incorporated herein by reference.

TECHNICAL FIELD

The disclosure relates to virtualized computing infrastructures.

BACKGROUND

Virtualized data centers are becoming a core foundation of the modern information technology (IT) infrastructure. In particular, modern data centers have extensively utilized virtualized environments in which virtual hosts, such virtual machines or containers, are deployed and executed on an underlying compute platform of physical computing devices.

Virtualization within a data center can provide several advantages. One advantage is that virtualization can provide significant improvements to efficiency. As the underlying physical computing devices (i.e., servers) have become increasingly powerful with the advent of multicore microprocessor architectures with a large number of cores per physical CPU, virtualization becomes easier and more efficient. A second advantage is that virtualization provides significant control over the computing infrastructure. As physical computing resources become fungible resources, such as in a cloud-based computing environment, provisioning and management of the compute infrastructure becomes easier. Thus, enterprise IT staff often prefer virtualized compute clusters in data centers for their management advantages in addition to the efficiency and increased return on investment (ROI) that virtualization provides.

A computing infrastructure that manages deployment and infrastructure for application execution may involve two main roles: (1) orchestration—for automating deployment, scaling, and operations of applications across clusters of hosts and providing computing infrastructure, which may include container-centric computing infrastructure; and (2) network management—for creating virtual networks in the network infrastructure to enable communication among applications running on virtualized computing environments, such as containers or VMs, as well as among applications running on legacy (e.g., physical) environments. Software-defined networking contributes to network management.

SUMMARY

In general, techniques are described for scalable virtualization of a plurality of tenant underlay networks and a plurality of subtenant overlay networks executed by a virtualized computing infrastructure so as to enable multi-tenancy overlay networks supported by multi-tenancy underlay networks. For example, an underlay controller for the virtualized computing infrastructure configures a Virtual Extensible Local Area Network (VXLAN) on a switch fabric of network switches. The underlay controller further configures a plurality of underlay network segments, each underlay network segment configured as a VXLAN segment of a plurality of VXLAN segments of the VXLAN. Each VXLAN segment of the plurality of VXLAN segments provides underlay network connectivity among a different subset of host computing devices of the virtualized computing infrastructure. The underlay controller assigns a different tenant of a plurality of tenants to each VXLAN segment of the plurality of VXLAN segments such that a different subset of host computing devices supports the VXLAN segment to which the tenant is assigned. Thus, the underlay controller may enable orchestration of multiple tenants in the VXLAN, each tenant having hardware within the VXLAN that is isolated from each other tenant.

Furthermore, because the underlay segments provide effective network isolation, a different overlay controller may control each of the subsets of the host computing devices of the virtualized computing infrastructure. With respect to a first subset of the host computing devices having underlay network connectivity by operation of a first VXLAN segment of the VXLAN segments, an overlay controller configures, e.g., a plurality of overlay networks on the first subset of the host computing devices. Thus, the overlay controller for the first subset of the host computing devices may enable orchestration of multiple subtenants in the first subset of the host computing devices supporting the underlay segment, each subtenant having a private network that is isolated from each other subtenant of the first subset of host computing devices.

The techniques of the disclosure may provide specific improvements to the computer-related field of virtualized computing infrastructure. Furthermore, the techniques of the disclosure may be integrated into numerous practical applications. For example, the techniques of the disclosure may allow for the robust and efficient scaling of tenants in an underlay network and subtenants in a plurality of overlay networks, thereby allowing for a much greater number of tenants and subtenants than supported by the use of VXLAN or VLAN alone. For example, the techniques of the disclosure may allow for the segmentation of each tenant of the underlay network to provide a private underlay environment or isolated hardware environment to each tenant. Additionally, the techniques of the disclosure may reduce the complexity of configuring overlay and underlay networks across the virtualized computing infrastructure and avoid the use of the inefficient spanning tree protocol to flood broadcast, unknown, and multicast (BUM) traffic. The techniques of the disclosure also allow for simplified management of access to isolated overlay networks from external networks as well as providing private access to hardware administration interfaces of servers (e.g., Intelligent Platform Management Interface (IPMI)). Furthermore, the techniques of the disclosure may enable the use of isolated environments for tenants and subtenants that allows for increased agility in the development and maintenance of application services within the virtualized computing infrastructure, as well as enabling service providers to offer improved white label services to other service providers and/or offer Bare Metal Server as a Service (BMSaaS) with agility and flexibility that is not currently possible with conventional techniques.

In one example, this disclosure describes a method comprising: configuring, by a first controller for a virtualized computing infrastructure, a plurality of underlay network segments in the virtualized computing infrastructure by configuring respective Virtual Extensible Local Area Network (VXLAN) segments of a plurality of VXLAN segments of a VXLAN in a switch fabric comprising network switches for the virtualized computing infrastructure to enable orchestration of multiple tenants in the VXLAN, wherein each VXLAN segment of the plurality of VXLAN segments provides underlay network connectivity among a different subset of host computing devices of the virtualized computing infrastructure; and configuring, by a second controller for a first subset of the host computing devices having underlay network connectivity by operation of a first VXLAN segment of the VXLAN segments, a plurality of overlay networks in the first subset of the host computing devices to enable orchestration of multiple subtenants in the first subset of the host computing devices.

In another example, this disclosure describes a system comprising: a first controller for a virtualized computing infrastructure, the first controller executing on processing circuitry and configured to configure a plurality of underlay network segments in the virtualized computing infrastructure by configuring respective Virtual Extensible Local Area Network (VXLAN) segments of a plurality of VXLAN segments of a VXLAN in a switch fabric comprising network switches for the virtualized computing infrastructure to enable orchestration of multiple tenants in the VXLAN, wherein each VXLAN segment of the plurality of VXLAN segments provides underlay network connectivity among a different subset of host computing devices of the virtualized computing infrastructure; and a second controller for a first subset of the host computing devices having underlay network connectivity by operation of a first VXLAN segment of the VXLAN segments, the second controller configured to configure a plurality of overlay networks in the first subset of the host computing devices to enable orchestration of multiple tenants in the first subset of the host computing devices.

In another example, this disclosure describes a non-transitory, computer-readable medium comprising instructions that, when executed, cause processing circuitry to execute: a first controller for a virtualized computing infrastructure, the first controller configured to configure a plurality of underlay network segments in the virtualized computing infrastructure by configuring respective Virtual Extensible Local Area Network (VXLAN) segments of a plurality of VXLAN segments of a VXLAN in a switch fabric comprising network switches for the virtualized computing infrastructure to enable orchestration of multiple tenants in the VXLAN, wherein each VXLAN segment of the plurality of VXLAN segments provides underlay network connectivity among a different subset of host computing devices of the virtualized computing infrastructure; and a second controller for a first subset of the host computing devices having underlay network connectivity by operation of a first VXLAN segment of the VXLAN segments, the second controller configured to configure a plurality of overlay networks in the first subset of the host computing devices to enable orchestration of multiple tenants in the first subset of the host computing devices.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
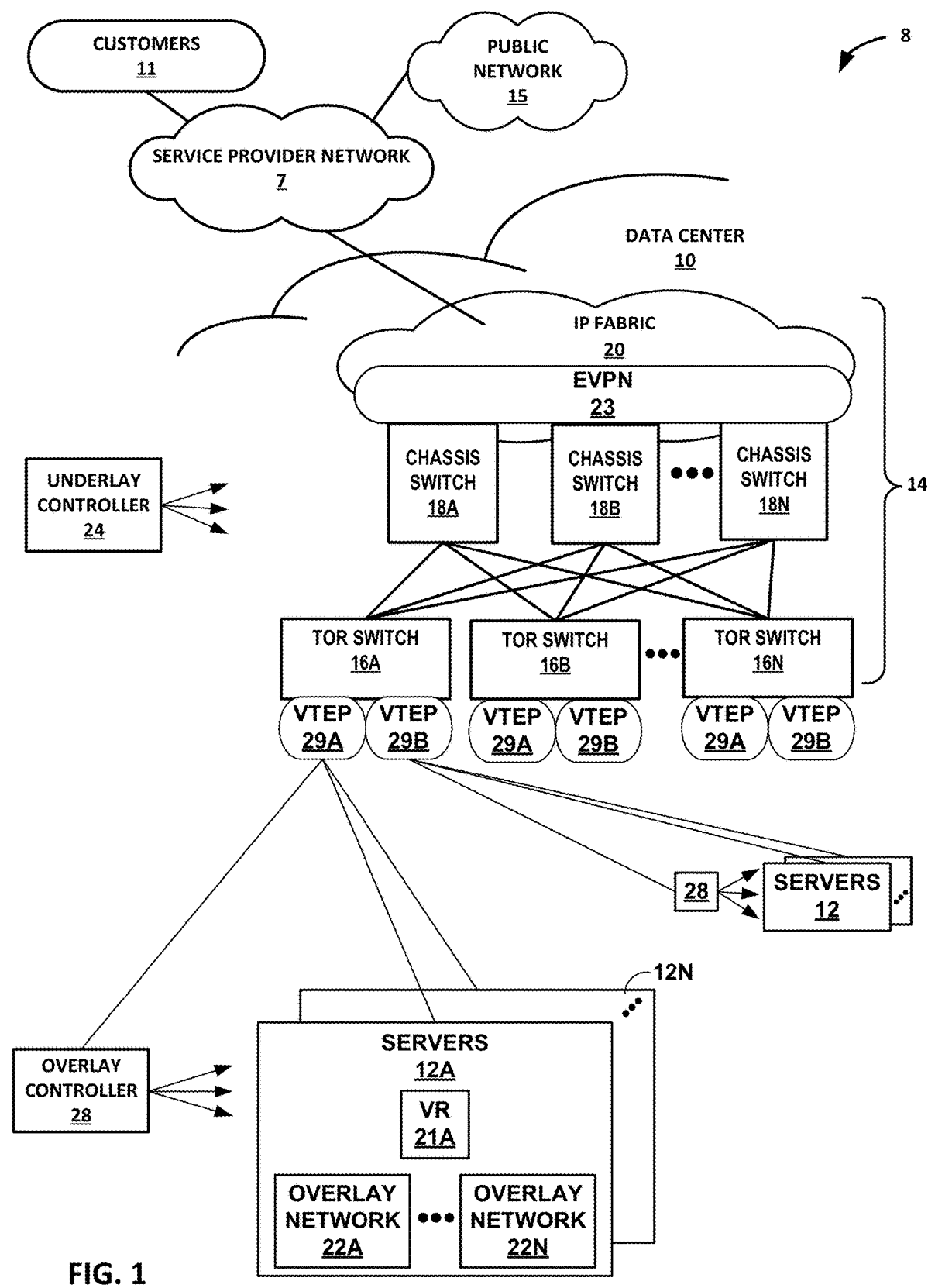
FIG. 1 is a block diagram illustrating an example network having a data center in which examples of the techniques described herein may be implemented.

FIG. 1 is a block diagram illustrating an example computing infrastructure 8 in which examples of the techniques described herein may be implemented. In general, data center 10 provides an operating environment for applications and services for a customer sites 11 (illustrated as "customers 11") having one or more customer networks coupled to the data center by service provider network 7. Data center 10 may, for example, host infrastructure equipment, such as networking and storage systems, redundant power supplies, and environmental controls. Service provider network 7 is coupled to public network 15, which may represent one or more networks administered by other providers, and may thus form part of a large-scale public network infrastructure, e.g., the Internet. Public network 15 may represent, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates service provider network 7, an enterprise IP network, or some combination thereof.

Although customer sites 11 and public network 15 are illustrated and described primarily as edge networks of service provider network 7, in some examples, one or more of customer sites 11 and public network 15 may be tenant networks within data center 10 or another data center. For example, data center 10 may host multiple tenants (customers) each associated with one or more virtual private networks (VPNs), each of which may implement one of customer sites 11. Service provider network 7 offers packet-based connectivity to attached customer sites 11, data center 10, and public network 15. Service provider network 7 may represent a network that is owned and operated by a service provider to interconnect a plurality of networks. Service provider network 7 may implement Multi-Protocol Label Switching (MPLS) forwarding and in such instances may be referred to as an MPLS network or MPLS backbone. In some instances, service provider network 7 represents a plurality of interconnected autonomous systems, such as the Internet, that offers services from one or more service providers.

In some examples, data center 10 may represent one of many geographically distributed network data centers. As illustrated in the example of FIG. 1, data center 10 may be a facility that provides network services for customers. A customer of the service provider may be a collective entity such as enterprises and governments or individuals. For example, a network data center may host web services for several enterprises and end users. Other exemplary services may include data storage, virtual private networks, traffic engineering, file service, data mining, scientific- or supercomputing, and so on. Although illustrated as a separate edge network of service provider network 7, elements of data center 10 such as one or more physical network functions (PNFs) or virtualized network functions (VNFs) may be included within the service provider network 7 core.

In this example, data center 10 includes storage and/or compute servers interconnected via switch fabric 14 provided by one or more tiers of physical network switches and routers, with servers 12A-12N (herein, "servers 12") depicted as coupled to top-of-rack switches 16A-16N. Servers 12 are computing devices and may also be referred to herein as "hosts" or "host devices."

Switch fabric 14 in the illustrated example includes interconnected top-of-rack (TOR) (or other "leaf") switches 16A-16N (collectively, "TOR switches 16") coupled to a distribution layer of chassis (or "spine" or "core") switches 18A-18N (collectively, "chassis switches 18"). Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Data center 10 may also include one or more physical network functions (PNFs) such as physical firewalls, load balancers, routers, route reflectors, broadband network gateways (BNGs), Evolved Packet Cores or other cellular network elements, and other PNFs.

In this example, TOR switches 16 and chassis switches 18 provide servers 12 with redundant (multi-homed) connectivity to IP fabric 20 and service provider network 7. Chassis switches 18 aggregate traffic flows and provides connectivity between TOR switches 16. TOR switches 16 may be network devices that provide layer 2 (MAC) and/or layer 3 (e.g., IP) routing and/or switching functionality. TOR switches 16 and chassis switches 18 may each include one or more processors and a memory and can execute one or more software processes. Chassis switches 18 are coupled to IP fabric 20, which may perform layer 3 routing to route network traffic between data center 10 and customer sites 11 by service provider network 7. The switching architecture of data center 10 is merely an example. Other switching architectures may have more or fewer switching layers, for instance.

In the example of FIG. 1, IP fabric 20 may utilize Ethernet VPN (E-VPN) technology to provide an EVPN data center interconnect (DCI) that allows data center 10 to perform multi-tenancy of a plurality of tenants within data center 10. An EVPN connects dispersed customer sites using a Layer 2 virtual bridge. As compared with other types of Layer 2 VPNs, an EVPN consists of customer edge (CE) devices, such as hosts, routers, or switches, such as switches 16, 18, connected to network access devices (not depicted) of IP fabric 20. The network access devices of IP fabric 20 may include an MPLS edge switch (MES) that acts at the edge of the MPLS infrastructure. In another example, a standalone switch can be configured to act as the MES. Multiple EVPNs may be deployed within a service provider network, such as network system 2 of FIG. 1, each providing network connectivity to a customer while ensuring that the traffic sharing on that network remains private. An EVPN may define multiple types of routes, such as, e.g., Ethernet AD routes, MAC/IP advertisement routes, and Ethernet Segment routes. In this way, IP fabric 20 provides EVPN 23 to transport L2 communications for customer networks while maintaining virtual isolation of the customer networks. In particular, IP fabric 20 enables EVPN 23 to transport L2 communications, such as Ethernet packets or "frames," through service provider network 7 for different customers of data center 10.

The term "packet flow," "traffic flow," or simply "flow" refers to a set of packets originating from a particular source device or endpoint and sent to a particular destination device or endpoint. A single flow of packets may be identified by the 5-tuple: <source network address, destination network address, source port, destination port, protocol>, for example. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet.

Servers 12 may each represent a compute server, switch, or storage server. For example, each of servers 12 may represent a computing device, such as an x86 processor-based server, configured to operate according to techniques described herein. Servers 12 may provide Network Function Virtualization Infrastructure (NFVI) for an NFV architecture.

Any server of servers 12 may be configured with virtual execution elements by virtualizing resources of the server to provide an isolation among one or more processes (applications) executing on the server. "Hypervisor-based" or "hardware-level" or "platform" virtualization refers to the creation of virtual machines that each includes a guest operating system for executing one or more processes. In general, a virtual machine ("VM" of FIG. 1) provides a virtualized/guest operating system for executing applications in an isolated virtual environment. Because a virtual machine is virtualized from physical hardware of the host server, executing applications are isolated from both the hardware of the host and other virtual machines. Each virtual machine may be configured with one or more virtual network interfaces for communicating on corresponding virtual networks.

Virtual networks, such as overlay networks 22A-22N (hereinafter, "overlay networks 22") are logical constructs implemented on top of the physical networks. Additionally, or alternatively, virtual networks may be used to replace VLAN-based isolation and provide multi-tenancy in a virtualized data center, e.g., data center 10. Each tenant or an application can have one or more virtual networks. Each virtual network may be isolated from all the other virtual networks unless explicitly allowed by security policy.

Virtual networks can be connected to, and extended across, physical Multi-Protocol Label Switching (MPLS) Layer 3 Virtual Private Networks (L3VPNs) and Ethernet Virtual Private Networks (EVPNs) networks using a datacenter 10 edge router (not shown in FIG. 1). Virtual networks may also be used to implement Network Function Virtualization (NFV) and service chaining.

Virtual networks can be implemented using a variety of mechanisms. For example, each virtual network could be implemented as a Virtual Local Area Network (VLAN), Virtual Private Networks (VPN), etc. A virtual network can also be implemented using two networks—the physical underlay network made up of IP fabric 20 and switching fabric 14 and a virtual overlay network. The role of the physical underlay network is to provide an "IP fabric," which provides unicast IP connectivity from any physical device (server, storage device, router, or switch) to any other physical device. The underlay network may provide uniform low-latency, non-blocking, high-bandwidth connectivity from any point in the network to any other point in the network.

Servers 12 may execute one or more virtual routers 21A-21N (hereinafter, virtual routers 21) and one or more virtual machines ("VMs" in FIG. 1). Virtual routers 21 running in the kernels or hypervisors of servers 12 create virtual overlay networks 22 on top of servers 12 using a mesh of dynamic "tunnels" amongst themselves. These overlay tunnels can be MPLS over GRE/UDP tunnels, or VXLAN tunnels, or NVGRE tunnels, for instance. The underlay physical routers and switches may not contain any per-tenant state, such as any Media Access Control (MAC) addresses, IP address, or policies for virtual machines or other virtual execution elements. The forwarding tables of the underlay physical routers and switches may only contain the IP prefixes or MAC addresses of the physical servers 12. (Gateway routers or switches that connect a virtual network to a physical network are an exception and may contain tenant MAC or IP addresses).

Virtual routers 21 of servers 12 do contain per tenant state. They contain a separate forwarding table (a routing-instance) per virtual overlay network 22. That forwarding table contains the IP prefixes (in the case of a layer 3 overlays) or the MAC addresses (in the case of layer 2 overlays) of the virtual machines or other virtual execution elements (e.g., pods of containers). No single virtual router 21 needs to contain all IP prefixes or all MAC addresses for all virtual machines in the entire data center. A given virtual router 21 only needs to contain those routing instances that are locally present on the server 12 (i.e. which have at least one virtual execution element present on the server 12.)

In some examples, instead of virtual-machine-based virtualization, servers 12 implement container-based virtualization. "Container-based" or "operating system" virtualization refers to the virtualization of an operating system to run multiple isolated systems on a single machine (virtual or physical). Such isolated systems represent containers, such as those provided by the open-source DOCKER Container application or by CoreOS Rkt ("Rocket"). Like a virtual machine, each container is virtualized and may remain isolated from the host machine and other containers. However, unlike a virtual machine, each container may omit an individual operating system and provide only an application suite and application-specific libraries. In general, a container is executed by the host machine as an isolated user-space instance and may share an operating system and common libraries with other containers executing on the host machine. Thus, containers may require less processing power, storage, and network resources than virtual machines. A group of one or more containers may be configured to share one or more virtual network interfaces for communicating on corresponding virtual networks.

In some examples, containers are managed by their host kernel to allow limitation and prioritization of resources (CPU, memory, block I/O, network, etc.) without the need for starting any virtual machines, in some cases using namespace isolation functionality that allows complete isolation of an application's (e.g., a given container) view of the operating environment, including process trees, networking, user identifiers and mounted file systems. In some examples, containers may be deployed according to Linux Containers (LXC), an operating-system-level virtualization method for running multiple isolated Linux systems (containers) on a control host using a single Linux kernel. LXC is an operating-system-level virtualization method for running multiple isolated Linux systems (containers) on a single control host (LXC host). An LXC does not use a virtual machine (although an LXC may be hosted by a virtual machine). Instead, an LXC uses a virtual environment with its own CPU, memory, block I/O, network, and/or other resource space. The LXC resource control mechanism is provided by namespaces and cgroups in the Linux kernel on the LXC host. Additional information regarding containers is found in "Docker Overview," Docker, Inc., available at docs.docker-.com/engine/understanding-docker, last accessed Jul. 9, 2016. Additional examples of containerization methods include OpenVZ, FreeBSD jail, AIX Workload partitions, and Solaris containers. Accordingly, as used herein, the term "containers" may encompass not only LXC-style containers but also any one or more of virtualization engines, virtual private servers, silos, or jails.

Servers 12 host virtual network endpoints for one or more virtual networks that operate over the physical network represented here by IP fabric 20 and switch fabric 14. As depicted in FIG. 1 and explained in further detail below, a subset of servers 12 host one or more overlay networks 22 that execute on top of an underlay network supported by an underlay segment.

One or more of servers 12 may each include a virtual router 21 that executes one or more routing instances for a corresponding overlay network 22 to provide virtual network interfaces and route packets among the virtual network endpoints of overlay network 22. Each of the routing instances may be associated with a network forwarding table. Each of the routing instances may represent a virtual routing and forwarding instance (VRF) for an Internet Protocol-Virtual Private Network (IP-VPN). Packets received by virtual router 21A of server 12A, for instance, from the underlay segment, may include an outer header to allow devices within the underlay segment to tunnel the payload or "inner packet" to a physical network address for server 12A that executes virtual router 21A. The outer header may include not only the physical network address of server 12A but also a virtual network identifier such as a VXLAN tag or Multiprotocol Label Switching (MPLS) label that identifies a specific underlay segment. An inner packet includes an inner header having a destination network address that conforms to the virtual network addressing space for overlay network 22A identified by the virtual network identifier, e.g., a VXLAN identifier that identifies the corresponding routing instance executed by the virtual router 21A.

Virtual routers 21 terminate virtual network overlay tunnels and determine virtual networks for received packets based on tunnel encapsulation headers for the packets, and forwards packets to the appropriate destination virtual network endpoints for the packets. For server 12A, for example, for each of the packets outbound from virtual network endpoints hosted by server 12A (e.g., overlay network 22A), the virtual router 21A attaches a tunnel encapsulation header indicating overlay network 22A for the packet to generate an encapsulated or "tunnel" packet, and virtual router 21A outputs the encapsulated packet via overlay tunnels for overlay network 22A to a physical destination computing device, such as another one of servers 12. As used herein, a virtual router 21 may execute the operations of a tunnel endpoint to encapsulate inner packets sourced by virtual network endpoints to generate tunnel packets and decapsulate tunnel packets to obtain inner packets for routing to other virtual network endpoints.

Network system 8 implements an automation platform for automating deployment, scaling, and operations of virtual execution elements across servers 12 to provide virtualized infrastructure for executing application workloads and services. In some examples, the platform may be a container orchestration platform that provides a container-centric infrastructure for automating deployment, scaling, and operations of containers to provide a container-centric infrastructure. "Orchestration," in the context of a virtualized computing infrastructure generally refers to provisioning, scheduling, and managing virtual execution elements and/or applications and services executing on such virtual execution elements to the host servers available to the orchestration platform. Container orchestration, specifically, permits container coordination and refers to the deployment, management, scaling, and configuration, e.g., of containers to host servers by a container orchestration platform. Example instances of orchestration platforms include Kubernetes, Docker swarm, Mesos/Marathon, OpenShift, OpenStack, VMware, and Amazon ECS.

Underlay controller 24 implements a Software-defined Networking (SDN) controller for the computing infrastructure 8. Underlay controller 24 may execute on one of servers 12 or another device or devices not depicted in FIG. 1. Underlay controller 24 may be a distributed application that executes on one or more computing devices. In general, underlay controller 24 controls the network configuration of EVPN 23 on switch fabric 14 to, e.g., establish one or more virtualized underlay segments for packetized communications among virtual network endpoints. Further, underlay controller 24 controls the deployment, scaling, and operations of virtual execution elements across EVPN 23. Underlay controller 24 provides a logically and in some cases physically centralized controller for facilitating operation of EVPN 23. In some examples, underlay controller 24 may operate in response to configuration input received from an administrator/operator. Additional information regarding the functioning of underlay controller 24 as a network controller operating in conjunction with other devices of data center 10 or other software-defined networks may be found in International Application Number PCT/US2013/044378, filed Jun. 5, 2013, and entitled "PHYSICAL PATH DETERMINATION FOR VIRTUAL NETWORK PACKET FLOWS;" and in U.S. patent application Ser. No. 14/226,509, filed Mar. 26, 2014, and entitled "Tunneled Packet Aggregation for Virtual Networks," each which is incorporated by reference as if fully set forth herein. U.S. patent application Ser. No. 14/226,509 also includes further description of a virtual router, such as virtual router 21A.

In accordance with the techniques of the disclosure, network 8 implements scalable virtualization of a plurality of tenant underlay networks supported by underlay network segments and a plurality of subtenant overlay networks 24 so as to enable multi-tenancy overlay networks supported by multi-tenancy underlay networks. For example, underlay controller 24 configures an underlay network on switch fabric 14. Underlay controller 24 further configures a plurality of underlay segments. As described in more detail with respect to FIG. 2, each underlay segment is a virtualized segment implemented by chassis switches 18 and TOR switches 16 of switch fabric 14. In some examples, the underlay network uses the VXLAN protocol and each underlay network segment is configured as a VXLAN segment of a plurality of VXLAN segments of the underlay network. Each underlay segment provides underlay network connectivity among a different subset of host computing devices (e.g., servers 12) of network 8.

Underlay controller 24 assigns a different tenant of a plurality of tenants to an underlay network that transports L2 communications through a respective underlay segment such that a different subset of host computing devices (e.g., servers 12) supports the underlay segment to which the tenant is assigned. As such, chassis switches 18 and TOR switches 16 may receive customer traffic for the tenant respective servers 12 via VXLAN Tunnel Endpoints 29A-29B (hereinafter, "VTEPs 29") corresponding to the underlay segment and forward the traffic to service provider network 7 via EVPN 23. Similarly, chassis switches 18 and TOR switches 16 may receive L2 communications from EVPN 23 and forward the L2 communications for transport to servers 12 via VTEPs 29 corresponding to the underlay segment. In this way, VTEPs 29 for the underlay segments operate as gateways between EVPN 23 and subsets of servers 12. That is, each underlay segment may include logically separate routing instances for servers 12 and each VTEP 29 operates to bridge traffic between the two distinct internal routing instances. For ease of illustration, FIG. 1 depicts only VTEP 29A of TOR switch 16A as having connections to a first subset of servers 12 and VTEP 29B of TOR switch 16A as having connections to a second subset of servers 12. However, VTEPs 29A and 29B of other TOR switches 16B-16N typically are also connected to each subset of servers 12. Thus, underlay controller 24 may enable orchestration of multiple tenants in EVPN 23, each tenant having logically isolated underlay networks overlaid on chassis switches 18 and TOR switches 16. That is, various customer networks provided within data centers 5 may be virtually isolated onto different underlay segments of EVPN 23.

Each underlay segment may support a plurality of overlay networks 22 that execute on a subset of host computing devices. For example, as depicted in the example of FIG. 1, each underlay segment supports overlay networks 22A-22N that execute on a set of servers 12A-12N. Further, a different overlay controller 28 is instantiated for each subset of host computing devices to control orchestration of overlay networks 22A-22N. For example, with respect to FIG. 1, overlay controller 28 implements an SDN controller for overlay networks 22A-22N of each underlay segment. Overlay controller 28 may execute on one of servers 12 or another device or devices not depicted in FIG. 1. Overlay controller 28 may be a distributed application that executes on one or more computing devices. In general, overlay controller 28 controls the network configuration of overlay networks 22 of the underlay segment for packetized communications among virtual network endpoints. Further, overlay controller 28 controls the deployment, scaling, and operations of virtual execution elements across overlay networks 22. Overlay controller 28 provides a logically and in some cases physically centralized controller for facilitating operation of overlay networks 22. In some examples, overlay networks 22 may operate in response to configuration input received from an administrator/operator. In some examples, overlay controller 28 operates as a network controller operating in conjunction with other devices of data center 10 or other software-defined networks as described by International Application Number PCT/US2013/044378 and U.S. patent application Ser. No. 14/226,509.

Overlay controller 28 assigns a subtenant of a plurality of subtenants of an underlay segment to a different overlay network 22 such that each subtenant may be virtually isolated from each other subtenant. That is, each overlay network 22 may include logically separate routing instances for servers 12 and each overlay network 22 operates to bridge traffic between the two distinct internal routing instances. Thus, overlay controller 28 may enable orchestration of multiple subtenants in overlay networks 22, each subtenant having a dedicated virtual network, using, for instance, VXLAN, that is isolated from the virtual networks of other subtenants within the underlay segment. Thus, overlay controller 28 may enable orchestration of multiple subtenants in the first subset of the host computing devices supporting the underlay segment, each subtenant having a private network that is isolated from each other subtenant of the first subset of host computing devices.

The techniques of the disclosure may provide specific improvements to the computer-related field of virtualized computing infrastructure. Furthermore, the techniques of the disclosure may be integrated into numerous practical applications. For example, the techniques of the disclosure may allow for the robust and efficient scaling of tenants in an underlay network and subtenants in a plurality of overlay networks, thereby allowing for a much greater number of tenants and subtenants than supported by the use of a single layer of VXLAN alone. For example, the techniques of the disclosure may allow for the segmentation of each tenant of the underlay network to provide a private underlay environment or isolated hardware environment to each tenant. Additionally, the techniques of the disclosure may reduce the complexity of configuring overlay and underlay networks across the virtualized computing infrastructure and avoid the use of the inefficient spanning tree protocol to flood broadcast, unknown, and multicast (BUM) traffic. The techniques of the disclosure also allow for simplified management of access to isolated overlay networks from external networks as well as providing private access to hardware administration interfaces of servers (e.g., Intelligent Platform Management Interface (IPMI)). Furthermore, the techniques of the disclosure may enable the use of isolated environments for tenants and subtenants that allows for increased agility in the development and maintenance of application services within the virtualized computing infrastructure, as well as enabling service providers to offer improved white label services to other service providers and/or offer Bare Metal Server as a Service as a Service (BMSaaS) with agility and flexibility that is not currently possible with conventional techniques.

Figure 2:
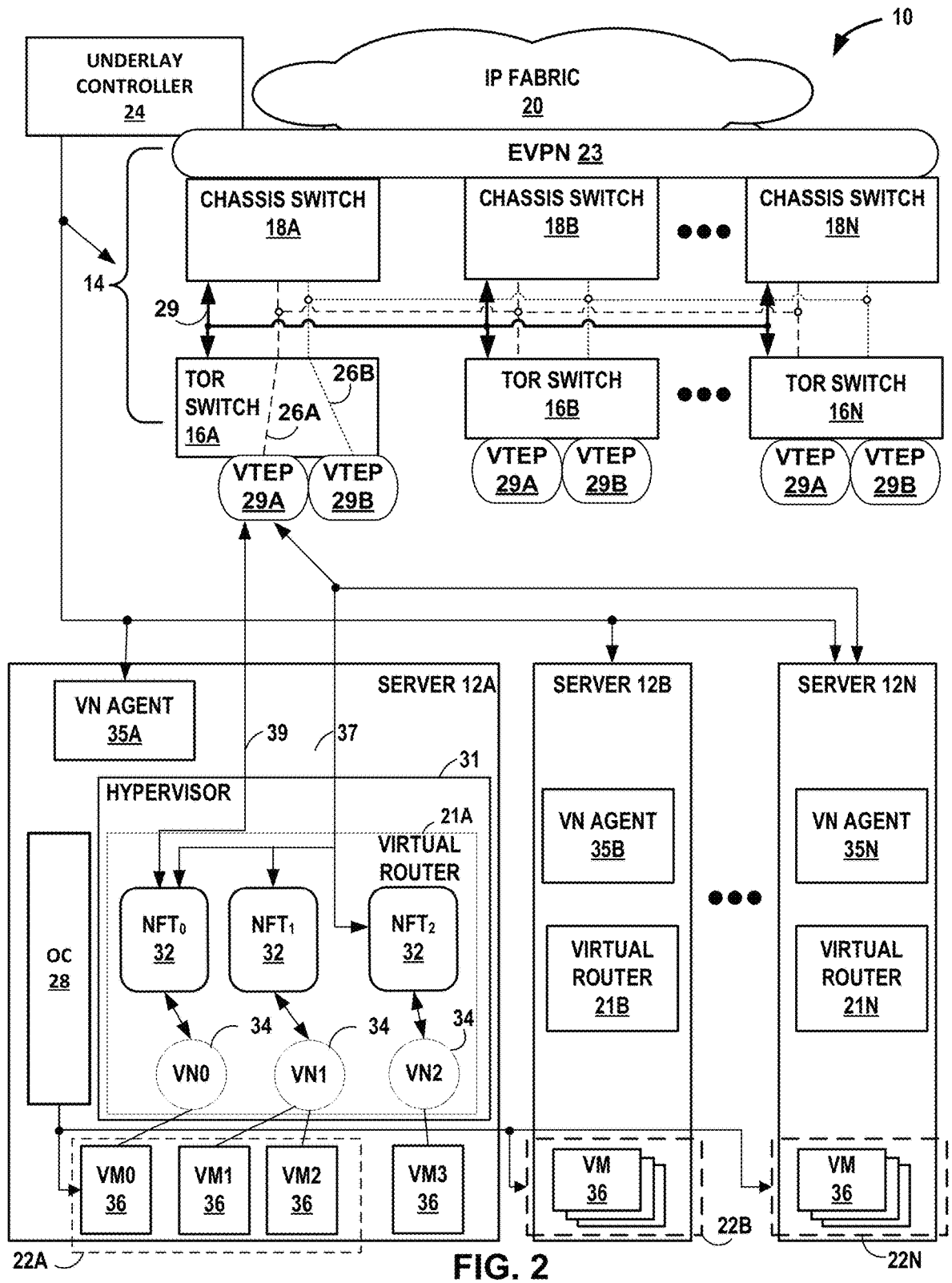
FIG. 2 is a block diagram illustrating an example implementation of the data center of FIG. 1 in further detail.

FIG. 2 is a block diagram illustrating an example implementation of data center 10 of FIG. 1 in further detail. In the example of FIG. 2, data center 10 includes underlay network segments 26A-26B (hereinafter, "underlay network segments 26" or "underlay segments 26") that extend switch fabric 14 from physical switches 16, 18 to software or "virtual" switches 30A-30N (collectively, "virtual routers 21"). Virtual routers 21 dynamically create and manage one or more virtual overlay networks 22 usable for communication between application instances. In one example, virtual routers 21 execute the virtual network as an overlay network, which provides the capability to decouple an application's virtual address from a physical address (e.g., IP address) of the one of servers 12A-12N ("servers 12") on which the application is executing. Each virtual overlay network 22 may use its own addressing and security scheme and may be viewed as orthogonal from underlay segment 26A and its addressing scheme or from the physical network and its addressing scheme. Various techniques may be used to transport packets within and across overlay networks 22 over underlay segment 26A and the physical network. In some examples, the techniques described in this disclosure provide multicast service within overlay networks 22 without requiring multicast support in underlay segment 26A or the underlying physical network.

Each virtual router 21 may execute within a hypervisor, a host operating system or other component of each of servers 12. Each of servers 12 may represent an x86 or other general-purpose or special-purpose server capable of executing virtual machines 36. In the example of FIG. 2, virtual router 21A executes within hypervisor 31, also often referred to as a virtual machine manager (VMM), which provides a virtualization platform that allows multiple operating systems to concurrently run on one of servers 12. In the example of FIG. 2, virtual router 21A manages overlay networks 22, each of which provides a network environment for execution of one or more virtual machines (VMs) 36 on top of the virtualization platform provided by hypervisor 31. Each VM 36 is associated with one of the virtual networks VN0-VN1 and may represent tenant VMs running customer applications such as Web servers, database servers, enterprise applications, or hosting virtualized services used to create service chains. In some cases, any one or more of servers 12 or another computing device may host customer applications directly, i.e., not as virtual machines. In some cases, some of VMs 36 may represent containers, another form of virtualized execution environment. That is, both virtual machines and containers are examples of virtualized execution environments for executing workloads.

In general, each VM 36 may be any type of software application and may be assigned a virtual address for use within a corresponding overlay network 22, where each of the virtual networks may be a different virtual subnet provided by virtual router 21A. A VM 36 may be assigned its own virtual layer three (L3) IP address, for example, for sending and receiving communications but may be unaware of, e.g., a VXLAN identifier for underlay segment 26A or an IP address of the physical server 12A on which the virtual machine is executing. In this way, a "virtual address" is an address for an application that differs from the logical address for the underlying, physical computer system, e.g., server 12A in the example of FIG. 1 or 2.

In one implementation, each of servers 12 includes a corresponding one of virtual network (VN) agents 35A-35N (collectively, "VN agents 35") that controls overlay networks 22 and that coordinates the routing of data packets within server 12. In general, each VN agent 35 communicates with overlay controller 28, which generates commands to control routing of packets between overlay networks 22 and VTEP 29A of underlay segment 26A. For ease of illustration, FIG. 2 depicts only VTEP 29A of TOR switch 16A as having connections to servers 12. However, VTEPs 29A of other TOR switches 16B-16N typically are likewise connected to servers 12. VN agents 35 may operate as a proxy for control plane messages between virtual machines 36 and overlay controller 28. For example, a VM 36 may request to send a message using its virtual address via the VN agent 35A, and VN agent 35A may in turn send the message and request that a response to the message be received for the virtual address of the VM 36 that originated the first message. In some cases, a VM 36 may invoke a procedure or function call presented by an application programming interface of VN agent 35A, and the VN agent 35A may handle encapsulation of the message as well, including addressing.

In some example implementations, each server 12 further includes overlay controller 28 that communicates directly with underlay controller 24. For example, responsive to instructions from underlay controller 24, overlay controller 28 communicates attributes of the particular overlay networks 22 executing on the respective server 12, and may create or terminate overlay networks 22.

In one example, network packets, e.g., layer three (L3) IP packets or layer two (L2) Ethernet packets generated or consumed by the instances of applications executed by virtual machines 36 within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet" or a "tunnel packet." Encapsulation and/or de-capsulation of virtual network packets within physical network packets may be performed within virtual routers 21, e.g., within the hypervisor or the host operating system running on each of servers 12. As another example, encapsulation and de-capsulation functions may be performed at the edge of switch fabric 14 at a first-hop TOR switch 16 that is one hop removed from the application instance that originated the packet. This functionality is referred to herein as tunneling and may be used within data center 10 to create one or more overlay networks 22 within an underlay segment 26A.

Besides IPinIP, other example tunneling protocols that may be used include IP over GRE, VxLAN, MPLS over GRE, MPLS over UDP, etc.

As noted above, overlay controller 28 provides a logically centralized controller for facilitating operation of one or more overlay networks 22 within underlay segment 26A. Overlay controller 28 may, for example, maintain a routing information base, e.g., one or more routing tables that store routing information for overlay networks 22 of underlay segment 26A. Further, underlay controller 24 may, for example, maintain a routing information base, e.g., one or more routing tables that store routing information for switches 16, 18 of underlay segment 26A. Similarly, switches 16, 18 and virtual routers 21 maintain routing information, such as one or more routing and/or forwarding tables. In one example implementation, virtual router 21A of hypervisor 31 implements a network forwarding table (NFT) 32 for each overlay network 22. In general, each NFT 32 stores forwarding information for the corresponding overlay network 22 and identifies where data packets are to be forwarded and whether the packets are to be encapsulated in a tunneling protocol, such as with a tunnel header that may include one or more headers for different layers of the virtual network protocol stack.

In accordance with the techniques of the disclosure, data center 10 may perform datacenter slicing, which allows for the creation of network-isolated groups of servers 12 by connecting them to switch fabric 14 and configuring underlay segments 26 (e.g., via VXLAN or another overlay protocol) on the switch port. Further, data center 10 may make servers 12 and networking devices 16, 18 available to their users.

As depicted in FIG. 2, switch fabric 14 is a physical underlay network that provides unicast IP connectivity amongst chassis switches 18 and TOR switches 16. The underlay network may provide uniform low-latency, non-blocking, high-bandwidth connectivity from any point in the network to any other point in the network. Further, a virtualized underlay network is overlaid upon switch fabric 14 and logically separated into underlay segments 26. In general, underlay controller 24 controls the network configuration of EVPN 23 on switch fabric 14 to, e.g., establish virtualized underlay segments 26 for packetized communications among virtual network endpoints (e.g., VTEPs 29). Thus, underlay controller 24 may logically isolate each tenant to a separate underlay segment 26 supported by chassis switches 18 and TOR switches 16.

Servers 12 attached to each isolated environment of an underlay segment 26 can be used to run separate cloud management systems, such as overlay networks 22, that can belong to multiple providers, multiple groups within an organization, or can be multiple deployments of the same cloud management system (e.g., development, testing, or production deployments). For example, the use of VXLAN networking with an EVPN control plane may avoid several issues that arise with a system that uses only VLANs. For example, the data center of FIG. 2 may be easier to configure correctly on multiple devices, is not bound by the 4096 scaling limit applicable to VLAN systems, may avoid the use of the inefficient spanning tree protocol, and may avoid flooding BUM traffic throughout each overlay network 22. Additionally, data center 10 may manage access to the isolated environments of underlay segments 26 for their users from external networks, and can provide private access to hardware administration interfaces of servers 12 (e.g. IPMI), by, e.g., configuring VRFs on gateway devices.

In one example data center 10 provides isolated environments via underlay segments 26 for executing multiple instances of a virtualized computing infrastructure. This may reduce the complexity of setting up multiple virtualized computing infrastructures within the same switching infrastructure, thereby simplifying development and testing of such infrastructures as well as improving the use of networking resources. Furthermore, data center 10 may reduce the burden to users that manage multiple cloud environments with different software versions and in different stages of deployment. Additionally, the use of data center 10 may an administrator of data center 10 to easily offer BMSaaS to multiple external organizations.

Cloud providers, whether private or public, desire to segment their infrastructure so that to each tenant, it appears that they have their own private networking environment. Conventionally, tenants are isolated at the VM or container level, and overlay networking provides connectivity between workloads according to network policy. A conventional orchestrator is used to ensure that each tenant can only create policies for connectivity between their own workloads. However, another level of segmentation is required if segmentation is required for physical hardware. For example, additional segmentation may be required at the server level to allow multiple "subtenants" to provide cloud services to their customers. The segmentation at the server level may require a segmented underlay network. Furthermore, the use of a segmented underlay network may be useful to prevent networking conflicts where different versions or sizes of an application stack need to be tested with identical configurations.

Conventionally, a segmented network may be implemented by configuring a VLAN on interfaces of network switches to which servers of each subtenant are connected. However, the configuration of VLANs on such switches may be complex. Further, such a system implements L2 networks with spanning trees between network segments, which may be inefficient, and such a system is limited to 4096 VLANs on a set of connected switches.

In accordance with the techniques of the disclosure, data center 10 automates the process, described herein as "data-center slicing," of segmenting the physical network of data center 10 using overlay networks 22 for use by subtenants to implement cloud or other services in an isolated environment. For example, the techniques of the disclosure may use an EVPN control plane which may be more robust and scalable than the use of VLANs alone. Data center 10 implements VXLAN (or some other encapsulation) to connect interfaces of physical servers 12 according to a network policy to create underlay network segments 26 between subsets of servers 12. Each tenant of data center 10 is allocated a pool of servers 12 (which need not be physical neighbors) that are encapsulated within a VXLAN segment 26 of a VXLAN network. Each tenant may then install an overlay controller 28 within the VXLAN segment and configure servers 12 as compute nodes for that overlay controller 28. Networking in a cloud is typically done using overlay networks 22 between virtual networking software components that run on each compute node 12.

Further, each underlay network segment 26 between switch ports is used to support an overlay network 22 for a subtenant. The two levels of encapsulation may run completely independently of each other and have no interaction. Thus, data center 10 may be "sliced" into multiple underlay segments 26 as described above. Further, the endpoints of underlay segments 26 may attach to overlay networks 22 to segment the subtenants within each underlay network segment 26. The endpoints of underlay segments 26 may be virtual switches or routers 21 attached to workload interfaces such as VMs 36 that run on compute nodes 12. Further, the subtenant environments are segmented by overlay networks 22 where the end points are encapsulation endpoints in switches attached to interfaces of servers 12.

Such subtenants may be, e.g., separate organizations from a tenant that manages the physical network (e.g., on one of underlay segments 26), different groups or departments within the owner of data center 10, or the administrators of data center 10. In addition to creating isolated subtenant environments, the techniques of the disclosure may provide access into those environments by configuring gateway devices. Through similar means to creating subtenant environments, the techniques of the disclosure may provide isolated subtenant access to server hardware administration interfaces.

In some examples, a gateway may be used to allow subtenant administrators to install and access orchestrator 28 within each underlay segment 26. This gateway may be configured to provide access from the subtenant environment to the IPMI (or other hardware administration interface) of servers 12. In this example, each IPMI address is accessible by both the subtenant administrator and the tenant administrator.

Segmented IPMI access may be provided to each subtenant by creating a VXLAN network that the IPMI interface of a server 12 is configured into when the server 12 is made available to a subtenant. In this case, each IPMI interfaces may be given from the tenant administrator to the subtenant administrator.

A single underlay orchestrator 24 may manage the tenant environments (e.g., underlay network segments 26) if appropriate gateway access is provided. For example, each tenant may be associated with an OpenStack project, wherein each OpenStack projects is allocated servers 12 in a dedicated availability zone. The availability zones can have an aggregate (tag) set such that only users in the associated project can manage these servers 12 and put workloads on them.

In some examples, data center 10 implements bare metal server (BMS) to VM/Container connectivity for a subtenant using slicing connectivity between physical servers 12 and virtual machines 36. In this example, the underlay segment 26 in which BMSs 12 are located may be configured to route traffic in switch fabric 14 without encapsulation. Network traffic from VM 36 within overlay network 22 is passed to underlay segment 26 and ARP requests from both VMs 36 and BMSs 12 is flooded into overlay network 22. In some examples, a virtual forwarder routes traffic directly between, e.g., overlay network 22A containing VMs 36 and underlay segment 26A containing BMSs 12.

In some examples, VMs 36 may use floating IP (FIP) addresses. For example, underlay controller 25 may assign, to each underlay segment 26, a plurality of FIP addresses. Overlay controller 28 may assign, to each overlay network 22, a subset of the plurality of FIP addresses assigned to an underlay segment 26 to which overlay controller 28 is instantiated. Furthermore, overlay controller 28 may assign, to each virtual router 21 within an overlay network 22, an FIP address of the subset of the plurality of FIP addresses.

In some examples, Source Network Address Translation (SNAT) may be used to exchange traffic between underlay segment 26A and overlay networks 22. For example, underlay controller 24 may provision, for underlay segment 26A, an SNAT gateway between a VTEP for underlay segment 26A and overlay networks 22 of underlay segment 26A. The SNAT gateway may perform address translation for VTEP 29A, servers 12, and virtual routers 21. For example, the SNAT gateway may serve to forward traffic received from virtual routers 21 of overlay networks 22 to VTEP 29A. Further, the SNAT gateway may serve to forward traffic received from VTEP 29A to virtual routers 21 of overlay networks 22. In one example, the SNAT function can be performed in the virtual router 21 on a server 12 where a virtual machine sending traffic is running.

Figure 3:
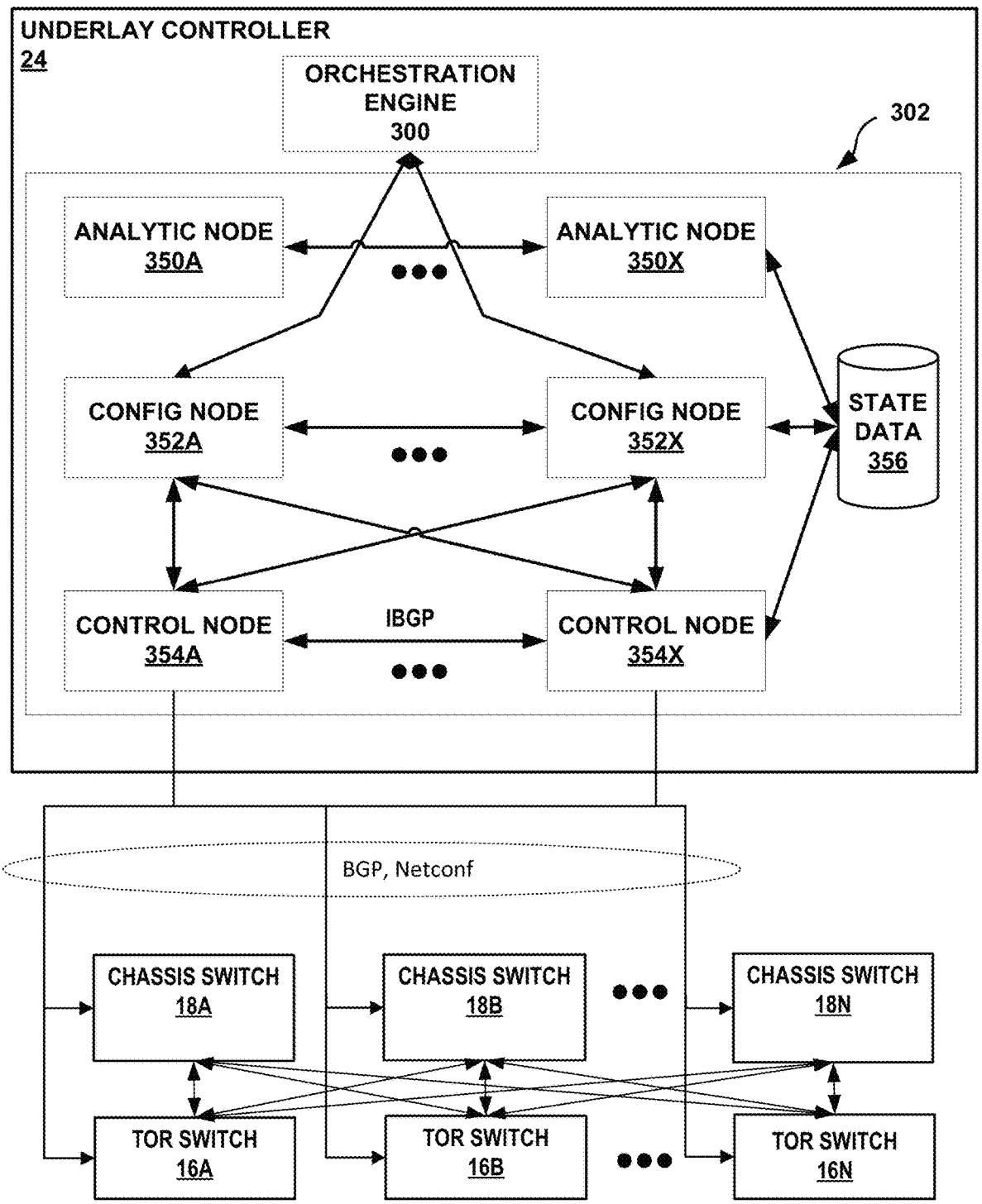
FIG. 3 is a block diagram illustrating an example implementation of the underlay controller of FIG. 1 in further detail.

FIG. 3 is a block diagram illustrating an example implementation of underlay controller 24 of FIG. 1 in further detail. In the example of FIG. 3, underlay controller 24 includes orchestration engine 300 and SDN controller 302.

SDN controller 302 includes one or more analytic nodes 350A-350X (collectively, "analytic nodes 350"), one or more configuration nodes 352A-352X (collectively, "configuration nodes 352") and control nodes 354A-354X (collectively, "control nodes 354"). In general, each of the nodes 350, 352, and 352 may be implemented as a separate software process, and the nodes may be distributed across multiple hardware computing platforms that provide an environment for execution of the software. Moreover, each of the nodes maintains state data 356, which may be stored within a centralized or distributed database. In some examples, state database 356 is a NoSQL database. In some examples, state database 356 is a database cluster.

In general, analytic nodes 350 are tasked with collecting, storing, correlating, and analyzing information from virtual and physical network elements within, e.g., EVPN 23 of data center 10 of FIG. 1. This information may include statistics, logs, events, and errors for use in managing the routing and network configuration of EVPN 23. Analytic nodes 350 store this information in state database 356.

Configuration nodes 352 translate the high-level data model of orchestration engine 300 into lower level models suitable for interacting with network elements, such as physical switches 16, 18. Configuration nodes 352 keep a persistent copy of the configuration state of SDN controller 302 within state database 56.

Control nodes 354 implement a logically centralized control plane responsible for maintaining ephemeral network state. Control nodes 354 interact with each other and with network elements, such as physical switches 16, 18, to ensure that the network state is eventually consistent with desired state as specified by orchestration engine 300. In general, control nodes 354 receive configuration state of SDN controller 302 from configuration nodes 352, and exchange routes with each other via IBGP to ensure that all control nodes 354 have the same network state. Further, control nodes 354 exchange routes with physical switches 16, 18 via BGP or Netconf. Control nodes 354 communicate the configuration state information, such as routing instances and forwarding policy, to physical switches 16, 18, e.g., via BGP or Netconf, for installation within physical switches 16, 18. Further, control nodes 354 exchange routes with physical switches 16, 18 via BGP, and exchange the configuration state of SDN controller 302 with physical switches 16, 18 via Netconf.

Configuration nodes 352 provide a discovery service that tenants of data center 10 may use to locate various services available within an underlay segment 26. For example, if a physical switch 16, 18 attempts a connection with control node 354A, it uses a discovery service provided by configuration nodes 352 to discover the IP address of control node 354A. Physical switches 16, 18 may use local configuration, DHCP or DNS to locate the service discovery server within configuration nodes 352.

In some examples, configuration nodes 352 present northbound API that interfaces with orchestration engine 300. Orchestration engine 300 uses this interface to install configuration state using the high-level data model. Configuration nodes 352 further include a message bus to facilitate communications amongst internal components. Configuration nodes 352 further include a transformer that discovers changes in the high-level model of orchestration engine 300 and transforms these changes into corresponding changes in the low level data model managed by SDN controller 302. In some examples, configuration nodes 352 further include a server that provides a southbound API to push computed low-level configuration down to control nodes 354. Furthermore, configuration nodes 352 include a distributed applications manager used to allocate unique object identifiers and to implement transactions across EVPN 23.

In accordance with the techniques of the disclosure, one or more control nodes 354 configures an underlay network on switches 16, 18. The one or more control nodes 354 further configure a plurality of underlay segments 26A-24N (hereinafter, "underlay segments 26"). As shown in FIG. 3, each underlay segment 26 includes different chassis switches 18 and TOR switches 16 of switch fabric 14 of FIG. 1 that support different subsets of servers 12 of FIG. 1. In some examples, the underlay network is a VXLAN and each underlay network segment 26 is configured as a VXLAN segment of a plurality of VXLAN segments of the VXLAN. Underlay segments 26 provide underlay network connectivity among a different subset of host computing devices (e.g., servers 12) of FIG. 1.

The one or more control nodes 354 assign a different tenant of a plurality of tenants to an underlay network that transports L2 communications through a respective underlay segment 26 such that a different subset of host computing devices (e.g., servers 12 of FIG. 1) supports the underlay segment 26 to which the tenant is assigned. As such, chassis switches 18 and TOR switches 16 of an underlay segment 26 may receive customer traffic for the tenant from servers 12 of FIG. 1 and forward the traffic through service provider network 7 of FIG. 1 the underlay network. Similarly, chassis switches 18 and TOR switches 16 may receive L2 communications from the underlay network and forward the L2 communications for transport to servers 12 via underlay segment 26. In this way, underlay segments 26 operate as gateways between the underlay network and the subsets of servers 12. Thus, the one or more control nodes 354 may enable orchestration of multiple tenants across switch fabric 14, each tenant being logically isolated from each other tenant on the switch fabric 14. That is, various customer networks provided within data centers 5 may be virtually isolated onto different underlay segments 26 of EVPN 23.

Figure 4:
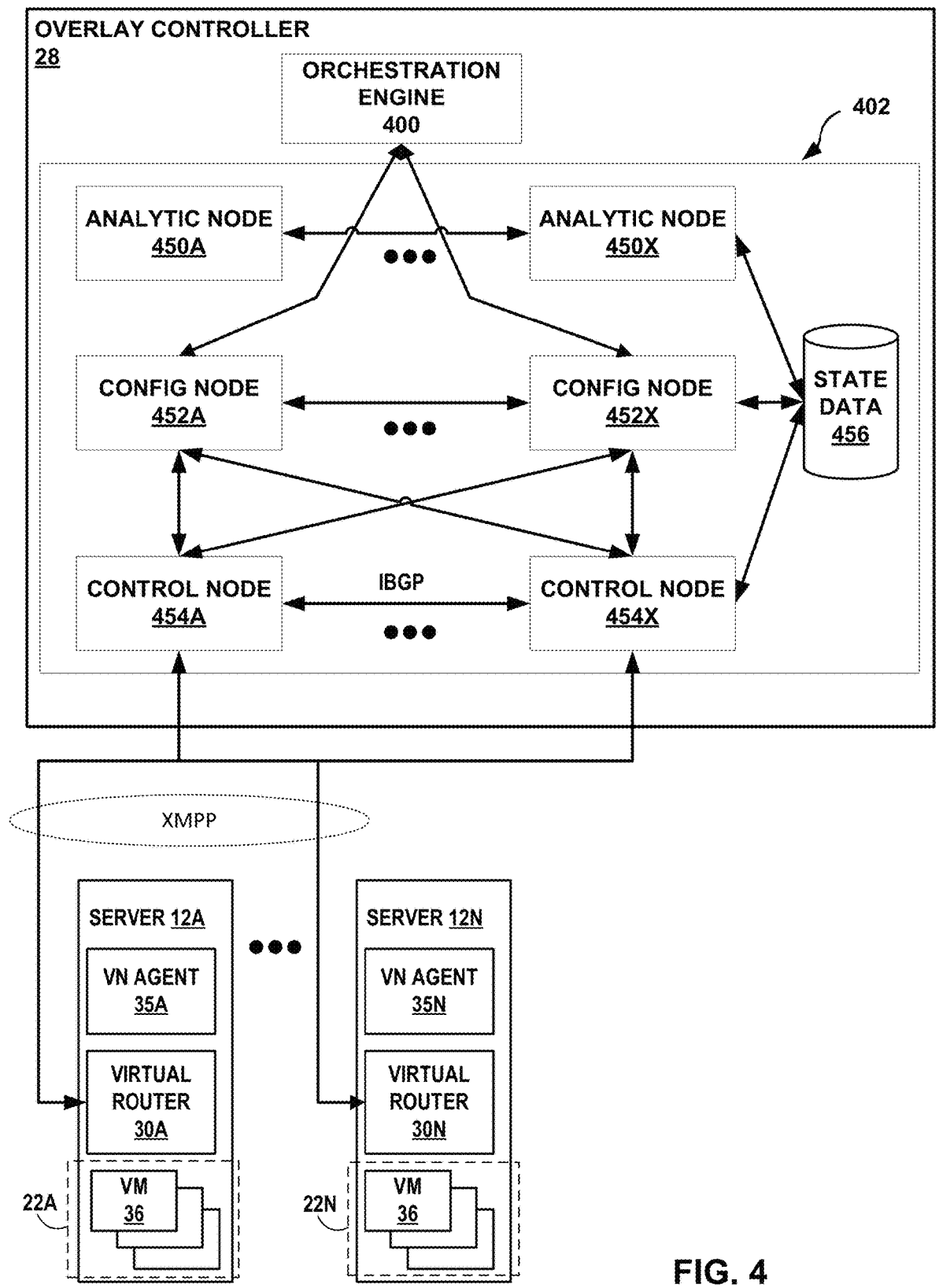
FIG. 4 is a block diagram illustrating an example implementation of the overlay controller of FIG. 1 in further detail.

FIG. 4 is a block diagram illustrating an example implementation of overlay controller 28 of FIG. 1 in further detail. In the example of FIG. 4, overlay controller 28 includes orchestration engine 400 and SDN controller 402. Orchestration engine 400 and SDN controller 402 may operate in a substantially similar fashion to orchestration engine 300 and SDN controller 302 of underlay controller 24 of FIG. 3, respectively.

SDN controller 402 includes one or more analytic nodes 450A-450X (collectively, "analytic nodes 450"), one or more configuration nodes 452A-452X (collectively, "configuration nodes 452") and control nodes 454A-454X (collectively, "control nodes 454"). In general, each of the nodes 450, 452, and 452 may operate in a substantially similar fashion to the like nodes 350, 352, and 352. However, in contrast to underlay controller 24, configuration nodes 452 may serve to configure VR agents 35 and overlay network 22, while control nodes 454 may serve to implement a logically centralized control plane responsible for maintaining ephemeral network state of VR agents 30 and overlay network 22. For example, control nodes 454 communicate the configuration state information, such as routing instances and forwarding policy, to VR agents 35, e.g., via XMPP, for installation within respective virtual routers 30.

In accordance with the techniques of the disclosure, one or more control nodes 454 control orchestration of overlay networks 22A-22N. For example, with respect to FIG. 4, the one or more control nodes 454 control the network configuration of overlay networks 22 of, e.g., underlay segment 26A of FIG. 1 for packetized communications among virtual network endpoints. Further, the one or more control nodes 454 control the deployment, scaling, and operations of virtual execution elements across overlay networks 22.

In some examples, the one or more control nodes 454 assign a subtenant of a plurality of subtenants of underlay segment 26A to a different overlay network 22 such that each subtenant may be virtually isolated from each other subtenant. That is, each overlay network 22 may include logically separate routing instances for servers 12 and each overlay network 22 operates to bridge traffic between the two distinct internal routing instances. Thus, the one or more control nodes 454 may enable orchestration of multiple subtenants in overlay networks 22, each subtenant having a dedicated virtual network, using, for instance, VXLAN, that is isolated from the virtual networks of other subtenants within underlay segment 26A. Thus, the one or more control nodes 454 may enable orchestration of multiple subtenants in a subset of the host computing devices 12 supporting, e.g., underlay segment 26A, each subtenant having a private network that is isolated from each other subtenant of the subset of host computing devices 12.

Figure 5:
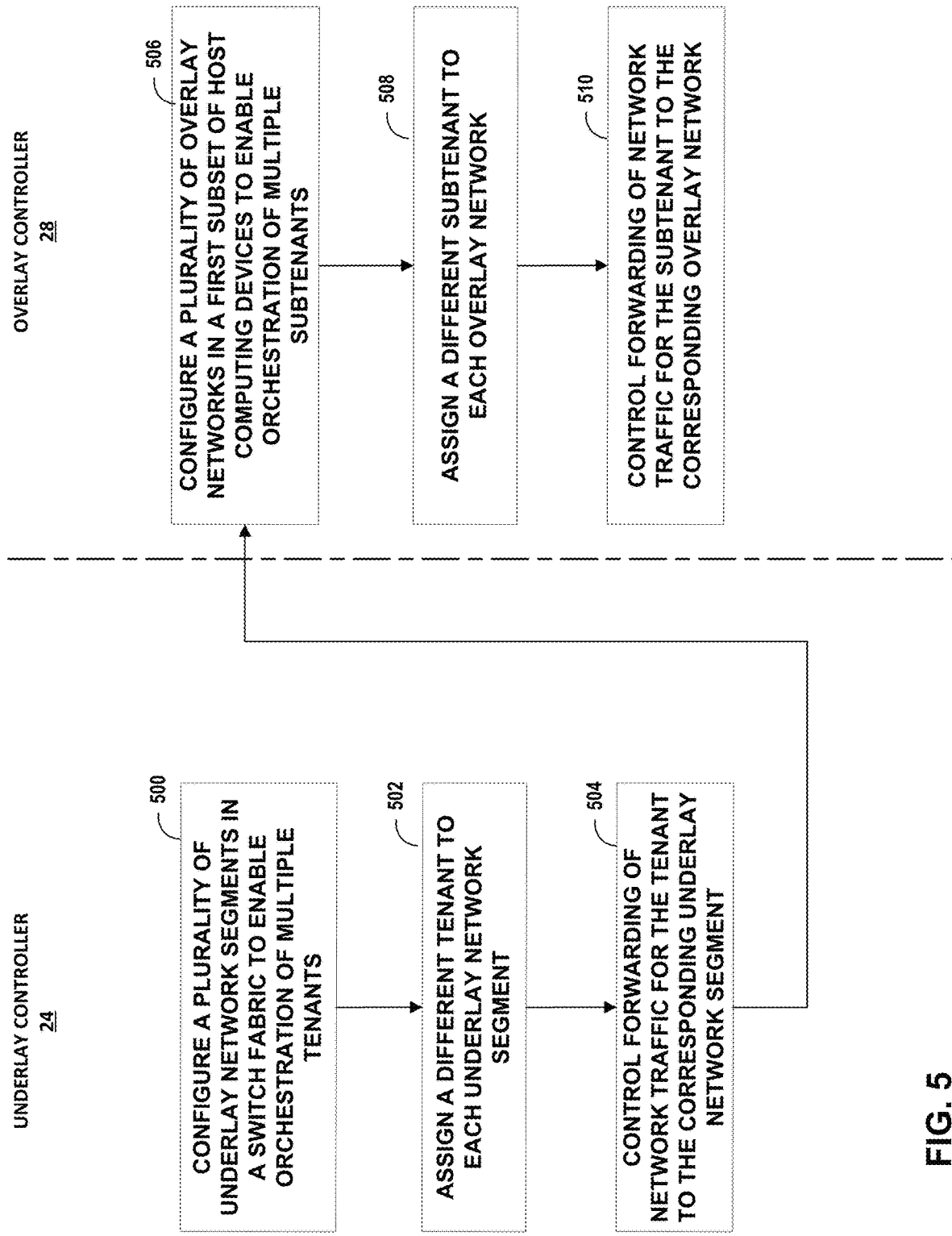
FIG. 5 is a flowchart illustrating an example operation in accordance with the techniques of the disclosure.

FIG. 5 is a flowchart illustrating an example operation in accordance with the techniques of the disclosure. For convenience, FIG. 5 is described with respect to FIG. 1.

With respect to the example of FIG. 5, underlay controller 24 configures a plurality of underlay network segments 26 to enable orchestration of multiple tenants (500). Each underlay segment is a virtualized segment implemented by chassis switches 18 and TOR switches 16 of switch fabric 14. In some examples, the underlay network is a VXLAN and each underlay network segment is configured as a VXLAN segment of a plurality of VXLAN segments of the VXLAN. Each underlay segment provides underlay network connectivity among a different subset of host computing devices (e.g., servers 12) of network 8.

Underlay controller 24 assigns a different tenant to each underlay network segment 26 (502). As such, chassis switches 18 and TOR switches 16 may receive customer traffic for the tenant respective servers 12 via VXLAN Tunnel Endpoints 29A-29B (hereinafter, "VTEPs 29") corresponding to the underlay segment and forward the traffic to service provider network 7 via EVPN 23. Similarly, chassis switches 18 and TOR switches 16 may receive L2 communications from EVPN 23 and forward the L2 communications for transport to servers 12 via VTEPs 29 corresponding to the underlay segment. In this way, VTEPs 29 for the underlay segments operate as gateways between EVPN 23 and subsets of servers 12. That is, each underlay segment may include logically separate routing instances for servers 12 and each VTEP 29 operates to bridge traffic between the two distinct internal routing instances. Underlay controller 24 controls forwarding of network traffic for the tenant to the corresponding underlay network segment (504). Thus, underlay controller 24 may enable orchestration of multiple tenants in EVPN 23, each tenant having logically isolated underlay networks overlaid on chassis switches 18 and TOR switches 16. That is, various customer networks provided within data centers 5 may be virtually isolated onto different underlay segments of EVPN 23.

Overlay controller 28 configures a plurality of overlay networks 22 in a first subset of host computing devices (e.g., servers 12) to enable orchestration of multiple subtenants (506). In general, overlay controller 28 controls the network configuration of overlay networks 22 of the underlay segment for packetized communications among virtual network endpoints. Further, overlay controller 28 controls the deployment, scaling, and operations of virtual execution elements across overlay networks 22.

Overlay controller 28 assigns a subtenant to each overlay network 22 (508). That is, each overlay network 22 may include logically separate routing instances for servers 12 and each overlay network 22 operates to bridge traffic between the two distinct internal routing instances. Thus, overlay controller 28 may enable orchestration of multiple subtenants in overlay networks 22, each subtenant having one or more dedicated virtual networks, using, for instance, VXLAN, that is isolated from the virtual networks of other subtenants within the underlay segment. Further, overlay controller 28 controls forwarding of network traffic for the subtenant to the corresponding overlay network 22 (510). Thus, overlay controller 28 may enable orchestration of multiple subtenants in the first subset of the host computing devices supporting the underlay segment, each subtenant having a private network that is isolated from each other subtenant of the first subset of host computing devices.

Figure 6:
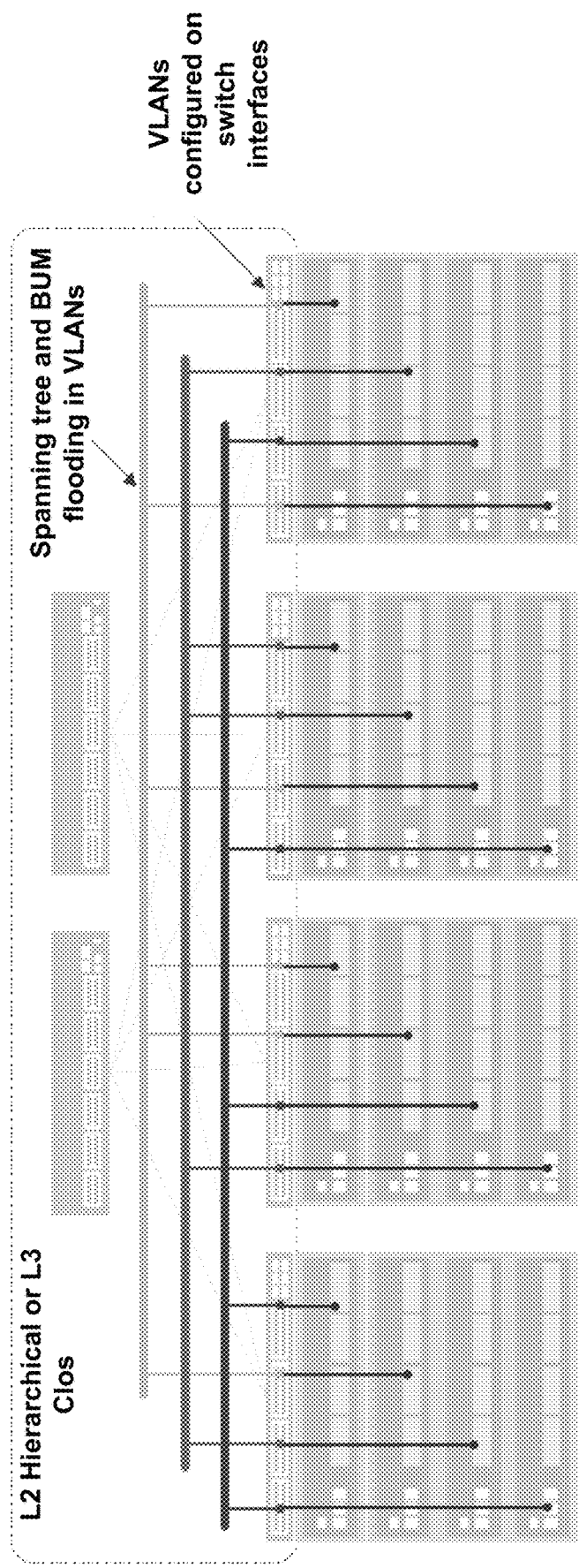
FIG. 6 is a block diagram illustrating an example of a segmented underlay network of a data center using VLANs.

FIG. 6 is a block diagram illustrating an example of a segmented underlay network of a data center using VLANs. Specifically, VLANs are configured on each switch interface of the segmented underlay network. The segmented underlay network of FIG. 6 may implement a Layer-2 hierarchy or Layer-3 Clos. One disadvantage of the segmented underlay network of FIG. 6 is that the use of spanning trees and BUM flooding in VLANs may be required.

Figure 7:
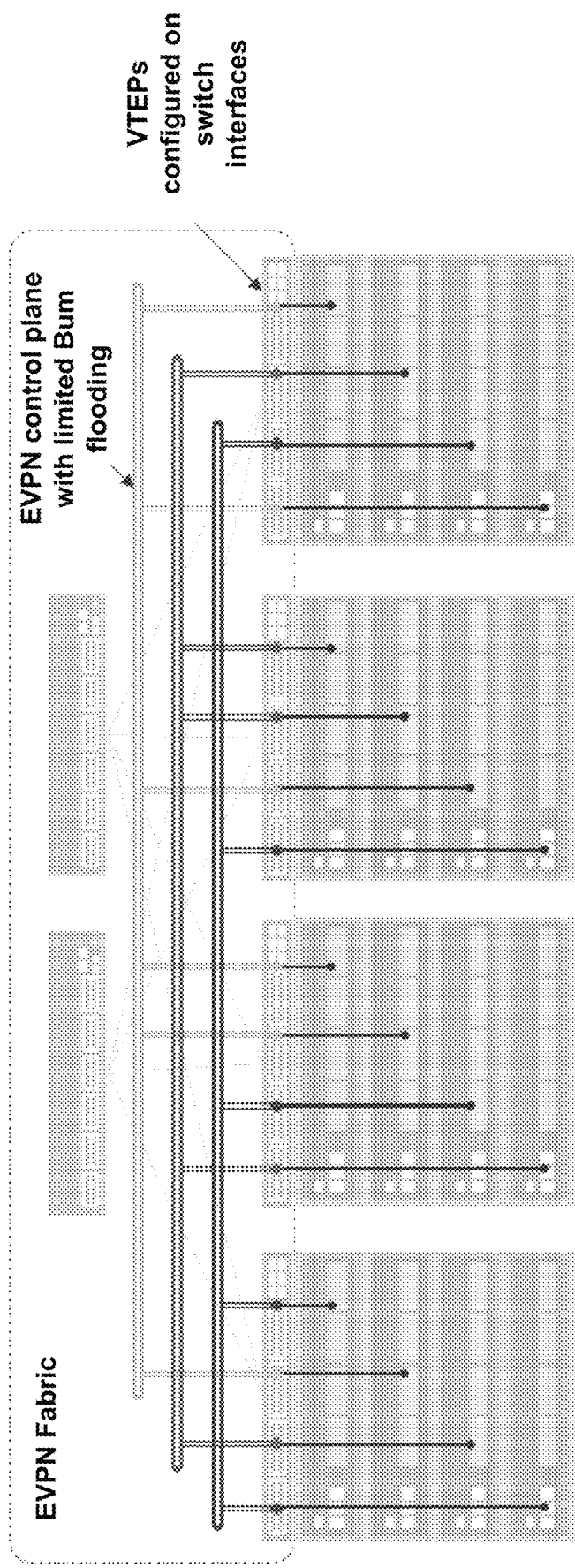
FIG. 7 is a block diagram illustrating an example of a segmented underlay network of a data center using VXLAN in accordance with the techniques of the disclosure.

FIG. 7 is a block diagram illustrating an example of a segmented underlay network of a data center using VXLAN in accordance with the techniques of the disclosure. The segmented underlay network of FIG. 7 may configure VTEPs on the switch interfaces. The use of VXLAN may allow the segmented underlay network of FIG. 7 to implement an EVPN control plane with limited BUM traffic flooding.

Figure 8:
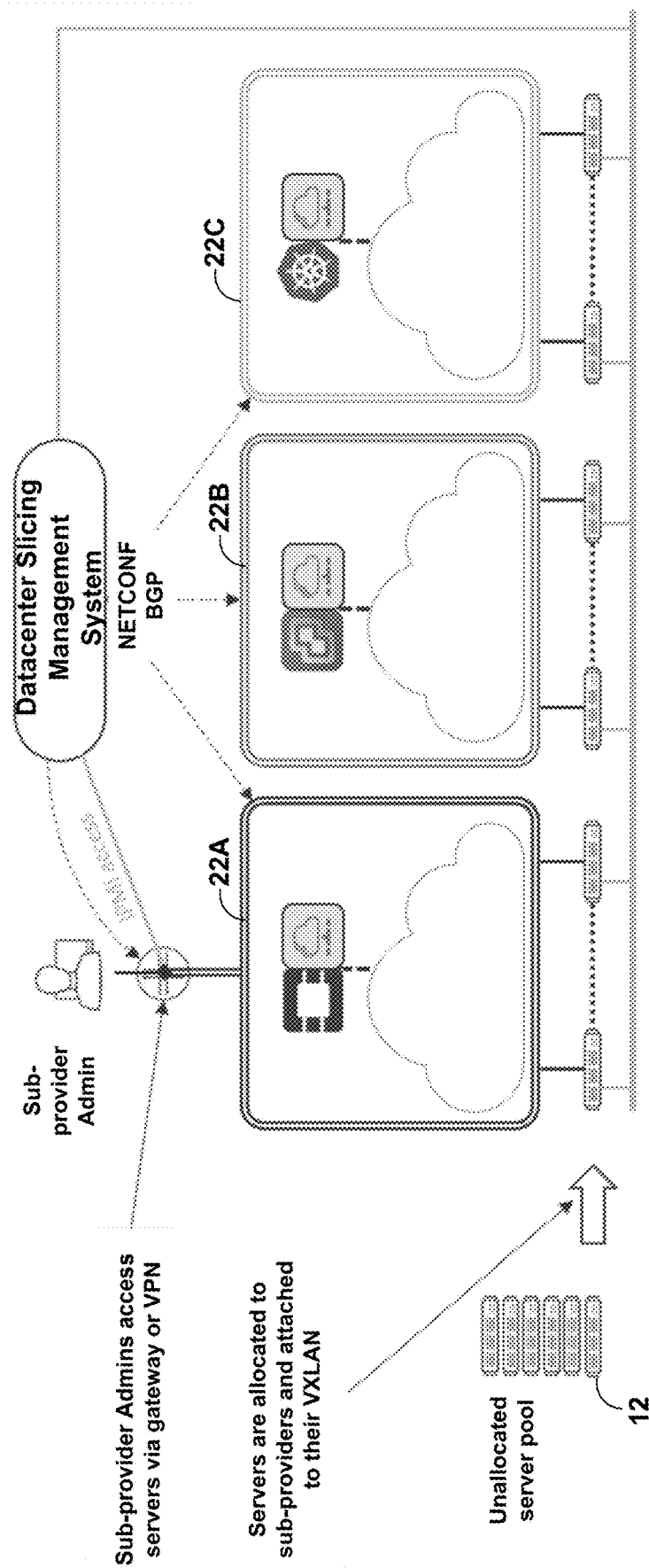
FIG. 8 is a block diagram illustrating an example of a plurality of isolated overlay networks in accordance with the techniques of the disclosure.
Figure 9:
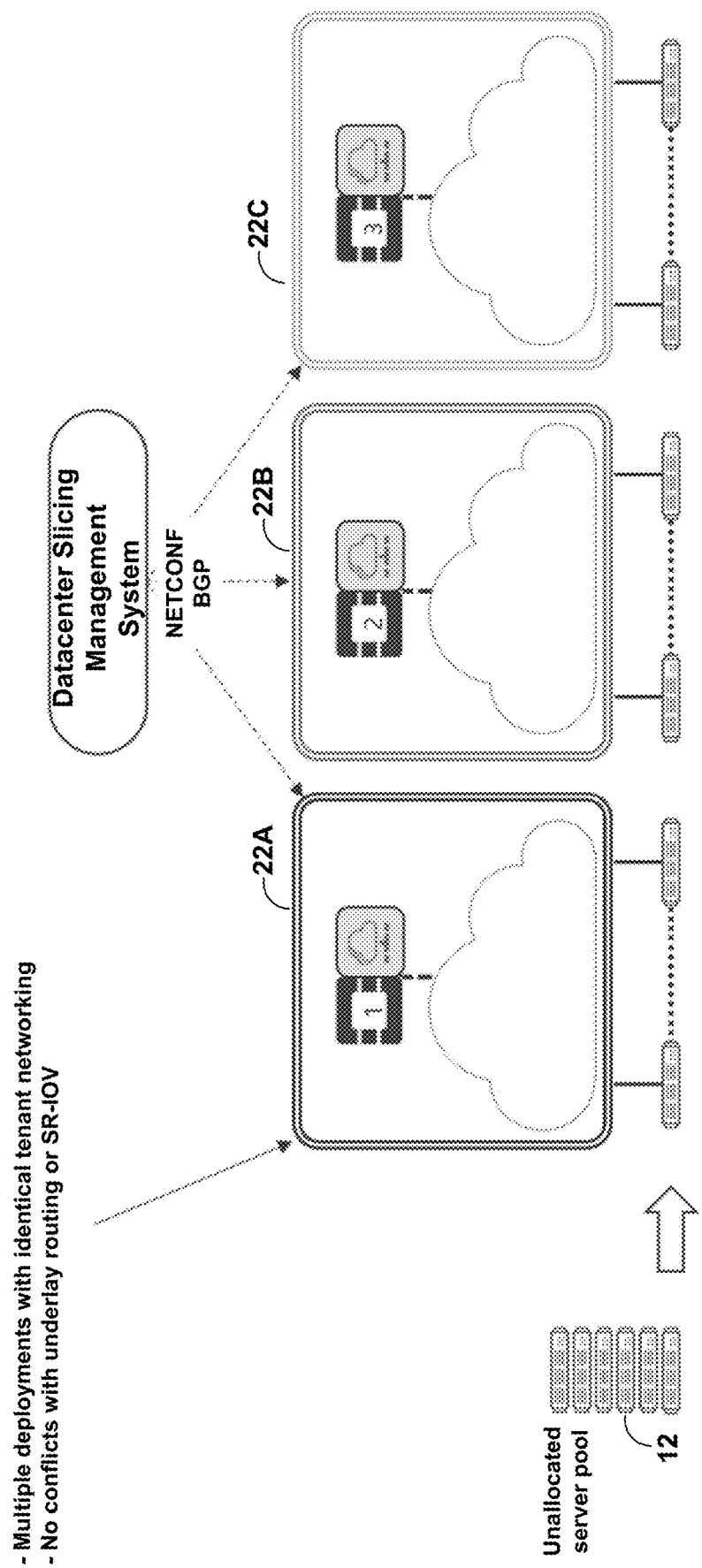
FIG. 9 is a block diagram illustrating another example of a plurality of isolated overlay networks in accordance with the techniques of the disclosure.

FIG. 8 is a block diagram illustrating an example of a plurality of isolated overlay networks 22 in accordance with the techniques of the disclosure. Isolated overlay networks 22 may be, e.g., isolated cloud environments for subproviders. A subprovider administrator may access servers 12 via a gateway or VPN. The data center may allocate servers to subproviders and attach the servers their VXLANs FIG. 9 is a block diagram illustrating another example of a plurality of isolated overlay networks 22 in accordance with the techniques of the disclosure. Isolated overlay networks 22 may be, e.g., isolated cloud environments for multiple lab deployments. The data center may perform multiple deployments with identical tenant networking. Overlay networks 22 may avoid conflicts with underlay routing or SR-IOV.

Figure 10:
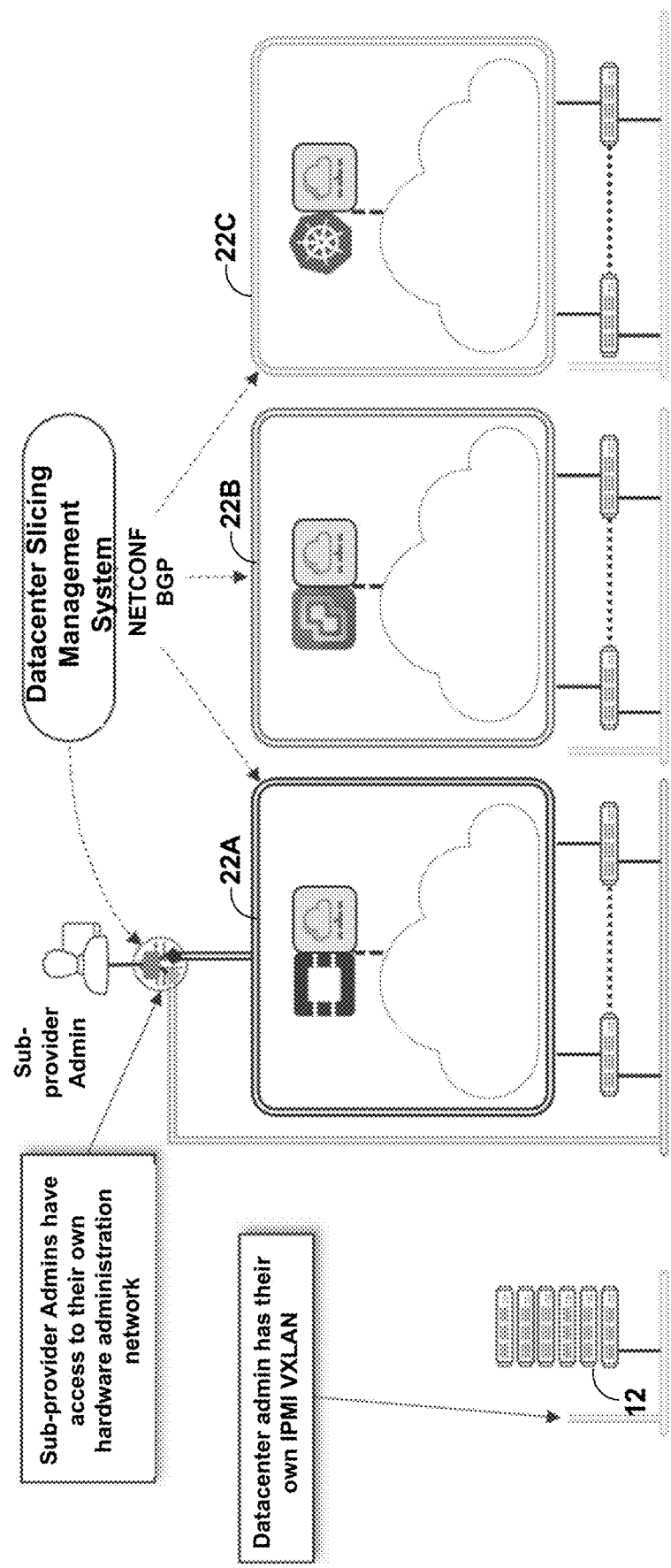
FIG. 10 is a block diagram illustrating an example of a sub-provider hardware administration network in accordance with the techniques of the disclosure.

FIG. 10 is a block diagram illustrating an example of a sub-provider hardware administration network in accordance with the techniques of the disclosure. The network of FIG. 10 may provide subprovider administrators with access to their own hardware administrative network. Further, administrators of the data center may have their own IPMI VXLAN.

Figure 11:
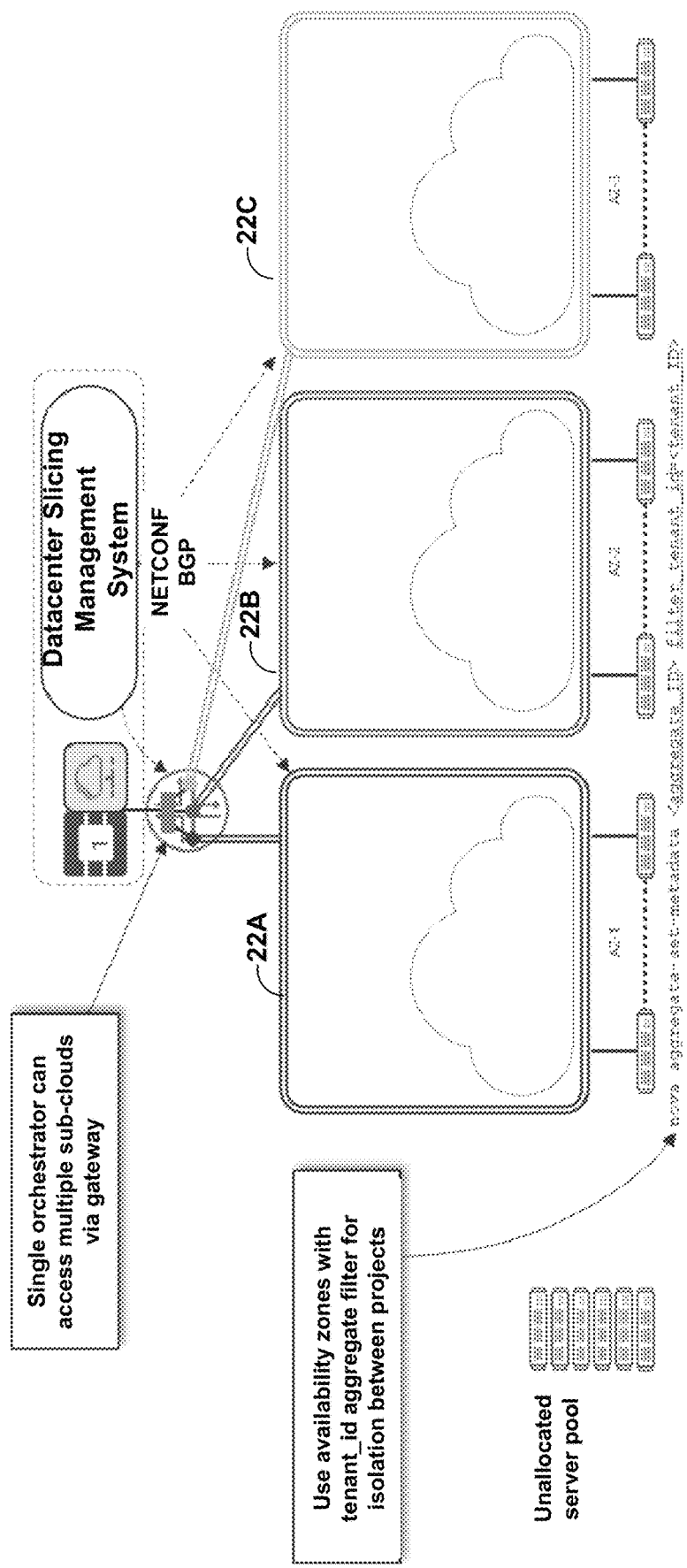
FIG. 11 is a block diagram illustrating an example of single-orchestrator cluster management of data center slicing and multiple isolated clouds, in accordance with the techniques of the disclosure.

FIG. 11 is a block diagram illustrating an example of single-orchestrator cluster management of data center slicing and multiple isolated clouds, in accordance with the techniques of the disclosure. The system of FIG. 11 may allow a single orchestrator to access multiple subclouds via a gateway. An administrator may use availability zones with a tenant ID aggregate filter to perform isolation between projects.

Figure 12:
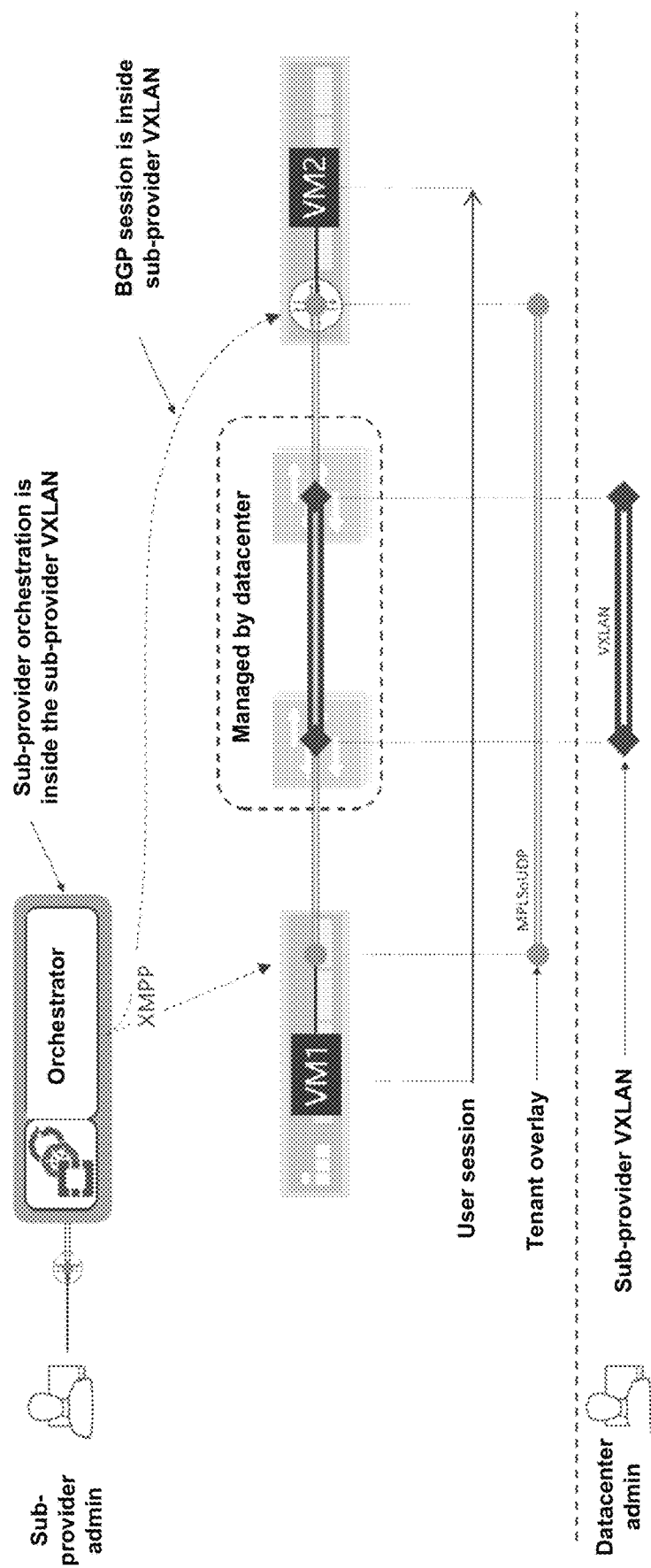
FIG. 12 is a block diagram illustrating an example of a data path between virtual machines (VMs) in a sub-provider network in accordance with the techniques of the disclosure.

FIG. 12 is a block diagram illustrating an example of a data path between virtual machines (VMs) in a sub-provider network in accordance with the techniques of the disclosure. As depicted in FIG. 12, the subprovider orchestration is performed within the subprovider VXLAN. Further, the VXLAN is managed by the data center, while a tenant overlay allows tunneling between VMs of the subprovider. A BGP session between the orchestrator and VMs is inside the subprovider VXLAN.

Figure 13:
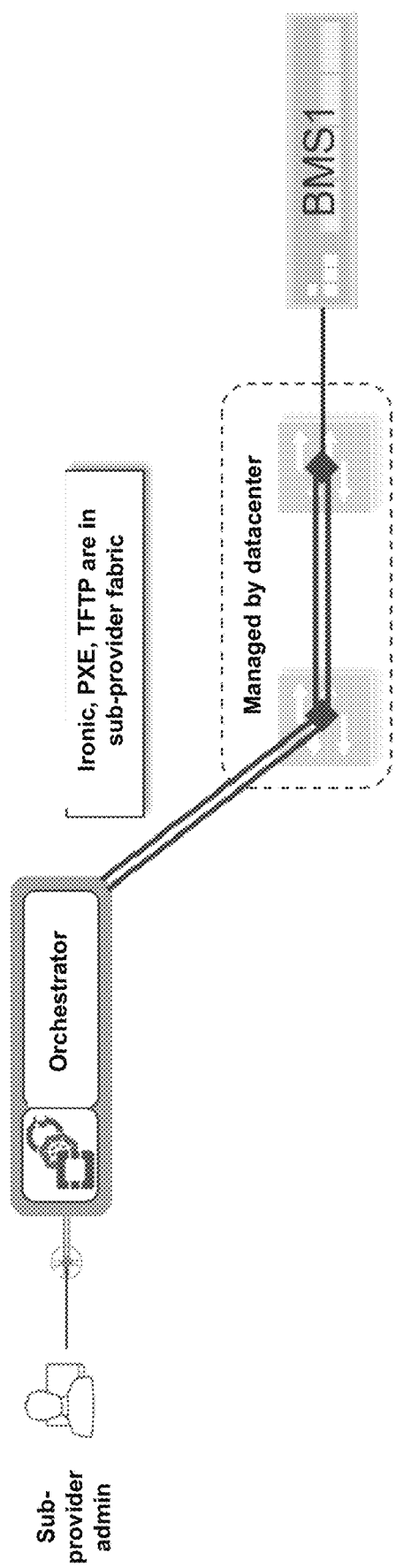
FIG. 13 is a block diagram illustrating an example of a data path for provisioning bare metal servers (BMSs) in accordance with the techniques of the disclosure.

FIG. 13 is a block diagram illustrating an example of a data path for provisioning bare metal servers (BMSs) in accordance with the techniques of the disclosure. A subprovider admin may cause the orchestrator to provision systems in an BMS. The orchestrator may use a VXLAN to connect to the BMS via switch fabric managed by the data center. In some examples, the orchestrator uses Ironic, PXE, TFTP, etc. in the subprovider fabric.

Figure 14:
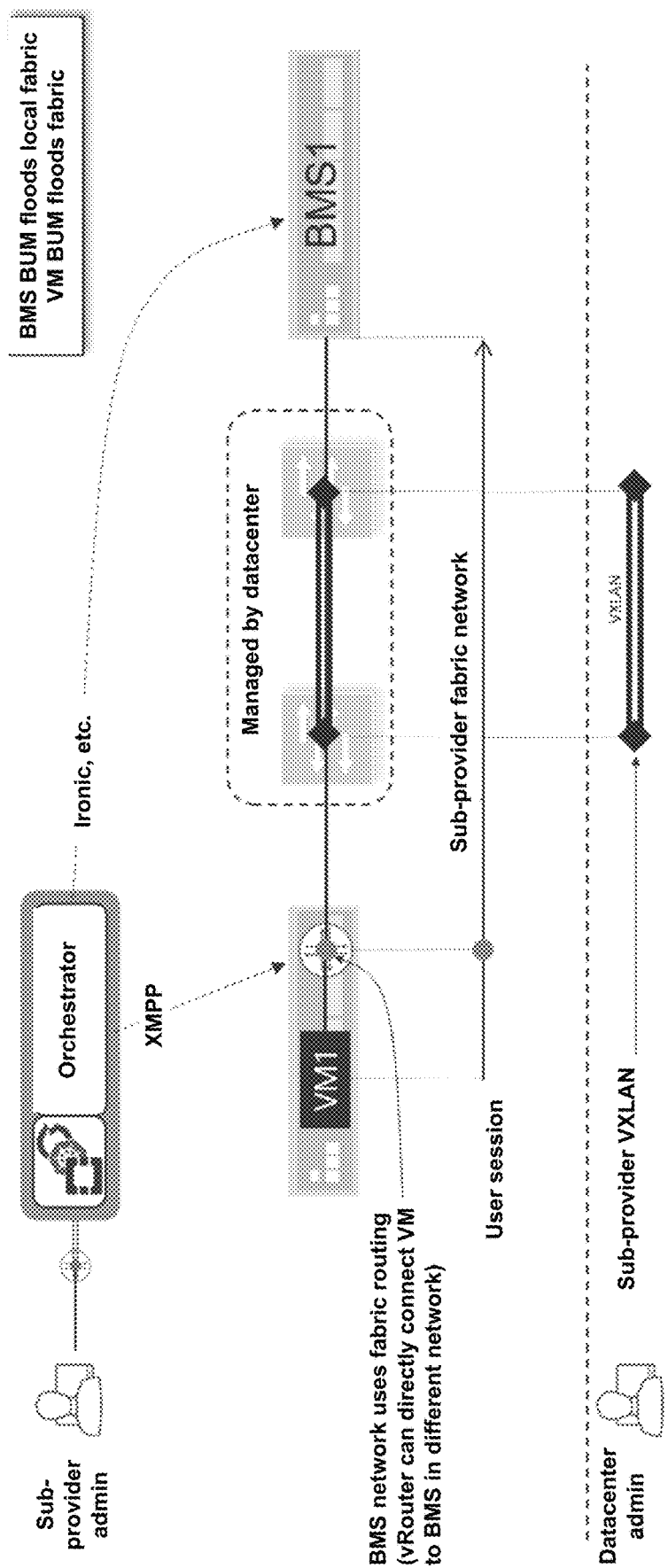
FIG. 14 is a block diagram illustrating an example of a data path between VMs and BMSs in accordance with the techniques of the disclosure.

FIG. 14 is a block diagram illustrating an example of a data path between VMs and BMSs in accordance with the techniques of the disclosure. As depicted by FIG. 14, the VM and BMS are in the same network. The BMS may flood the local fabric with BUM traffic. The VMs may flood the fabric with BUM traffic as well. The BMS network uses fabric routing. A vRouter may directly connect a VM to a BMS in a different network.

Figure 15:
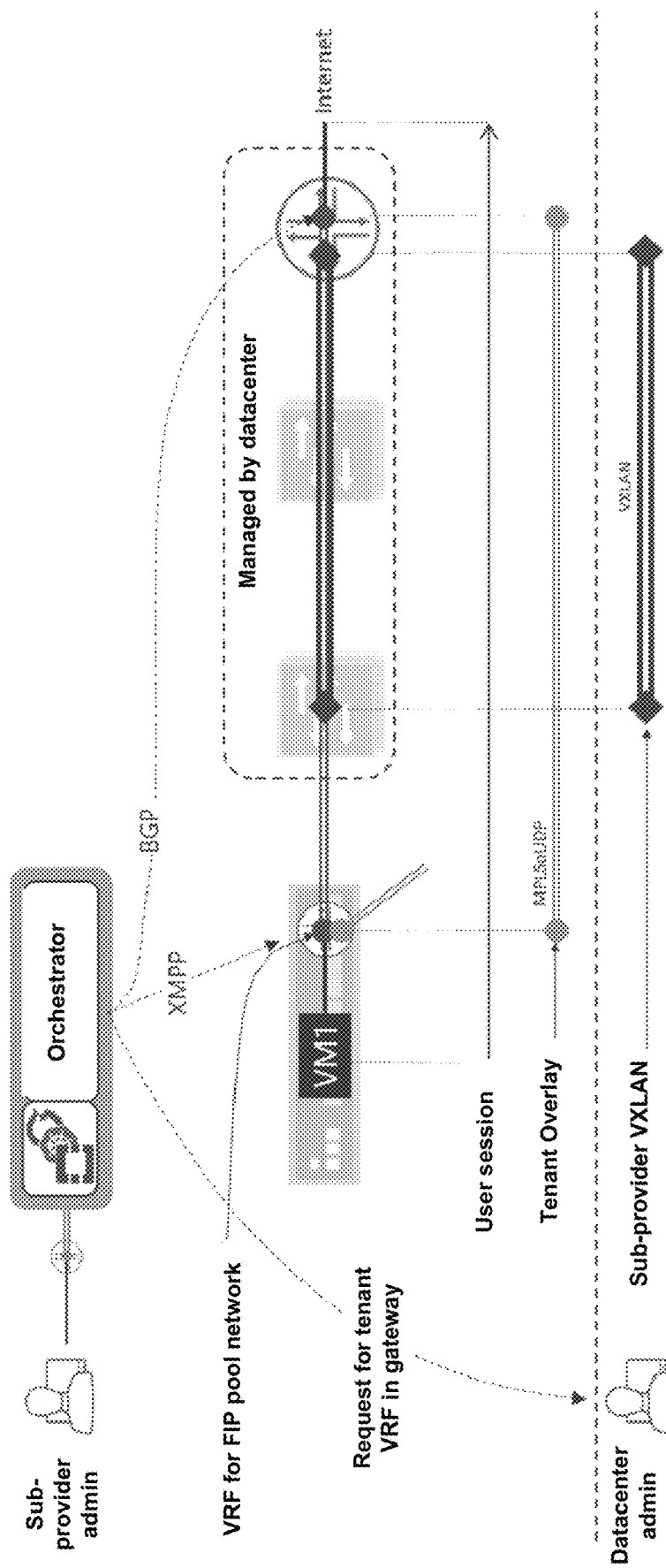
FIG. 15 is a block diagram illustrating an example of a floating IP address (FIP) data path in accordance with the techniques of the disclosure.

FIG. 15 is a block diagram illustrating an example of a floating IP address (FIP) data path in accordance with the techniques of the disclosure. The subprovider admin may cause the orchestrator to request a tenant VRF in the gateway from the data center admin. The orchestrator may use XMPP to manage the VM. For example, the orchestrator may establish a VRF for an FIP pool network. Further, the orchestrator may use BGP to access a gateway of the datacenter.

Figure 16:
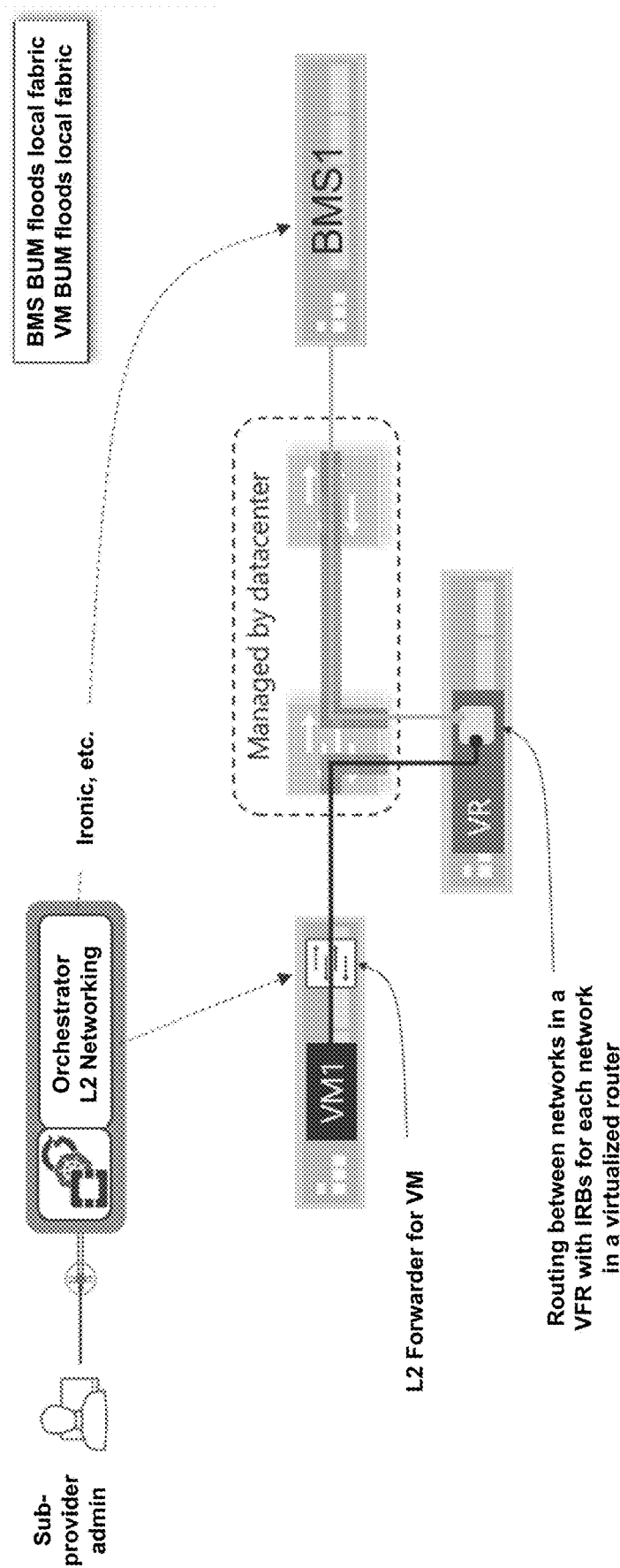
FIG. 16 is a block diagram illustrating an example use of VMs and BMS in different networks for a Layer-2 forwarder in accordance with the techniques of the disclosure.

FIG. 16 is a block diagram illustrating an example use of VMs and BMS in different networks for a Layer-2 forwarder in accordance with the techniques of the disclosure. Both the BMS and the VM may flood a local fabric with BUM traffic. The orchestrator may use Ironic, etc. to manage the BMS. Further, each VM may implement an L2 forwarder. Further, the system may perform routing between networks in a VRF with IRBs for each network in a virtualized router.

Figure 17:
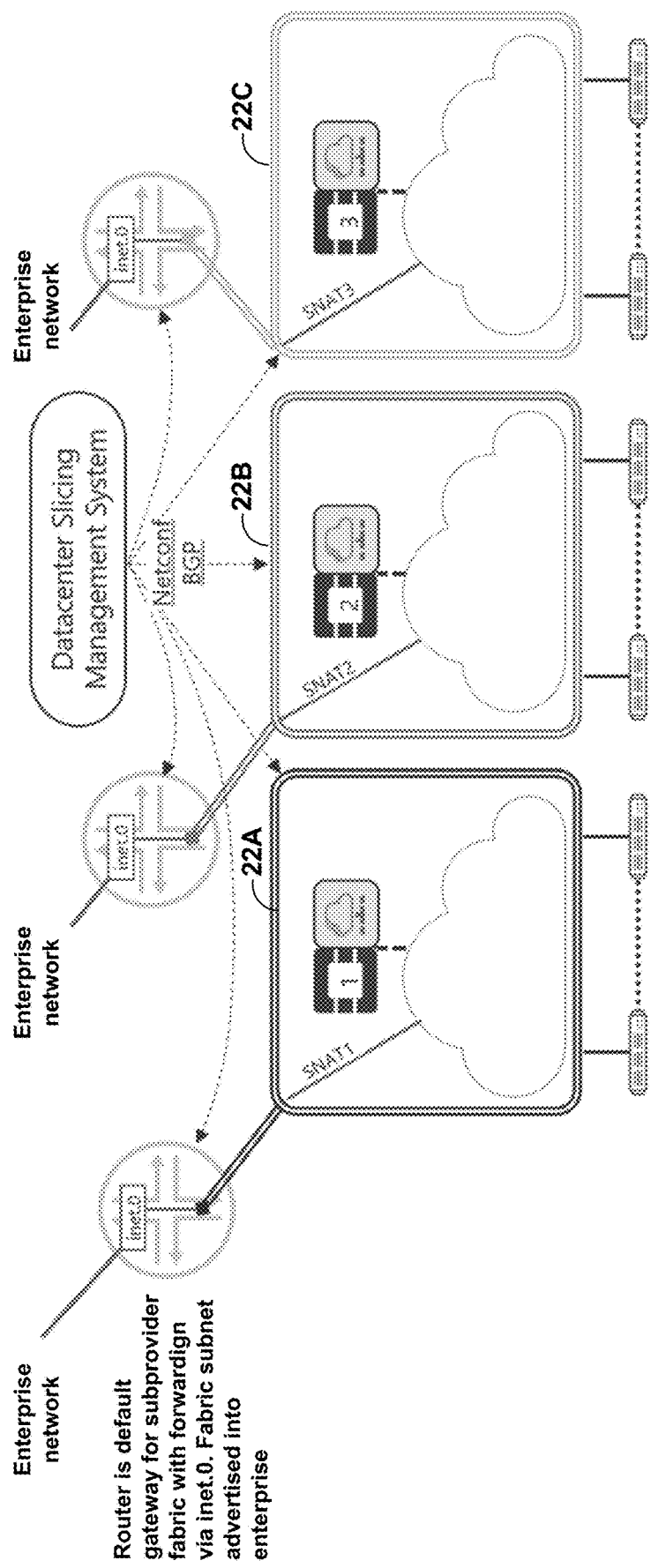
FIG. 17 is a block diagram illustrating an example of a source network address translation (SNAT) gateway for sub-providers in non-overlapping sub-provider fabrics in accordance with the techniques of the disclosure.

FIG. 17 is a block diagram illustrating an example of a source network address translation (SNAT) gateway for sub-providers in non-overlapping sub-provider fabrics in accordance with the techniques of the disclosure. An enterprise network may provide a router that is the default gateway for the subprovider fabric with forwarding via inet.0. The fabric subnet is advertised into the enterprise network.

Figure 18:
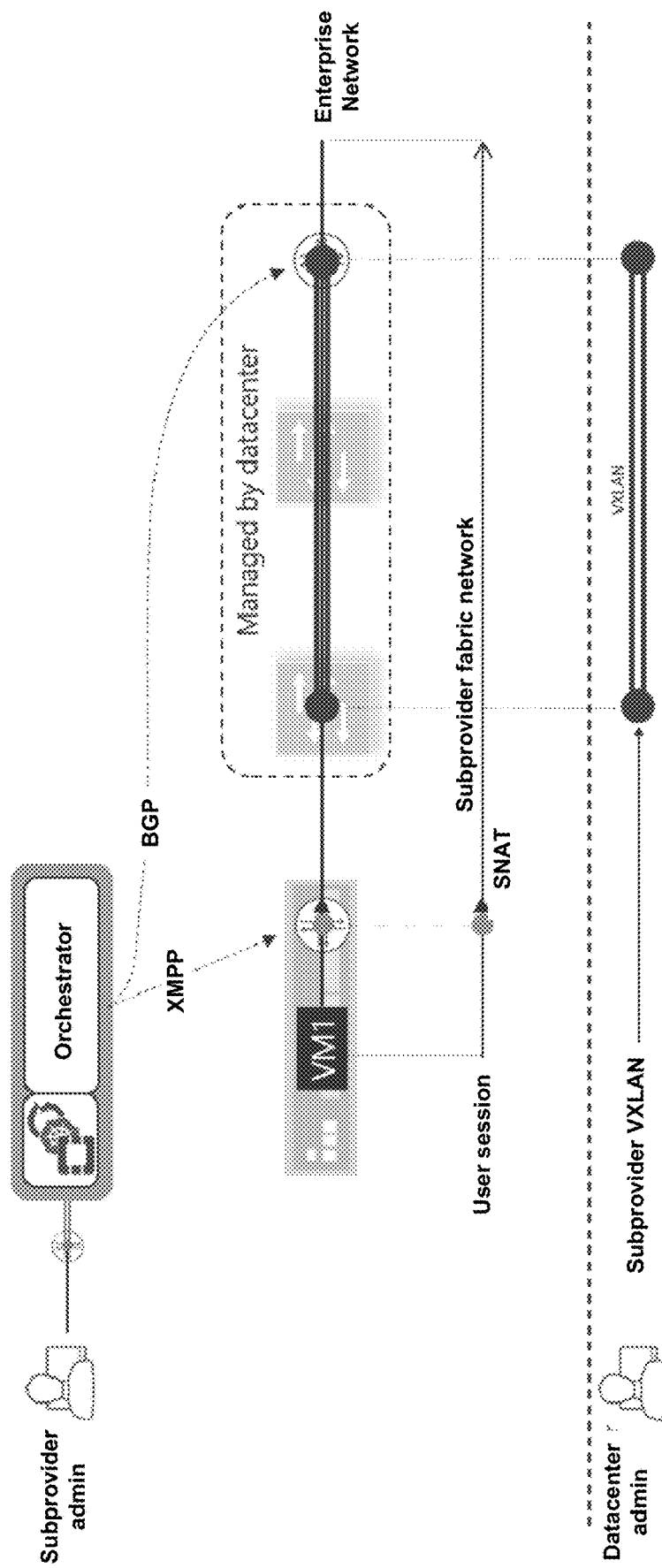
FIG. 18 is a block diagram illustrating an example of an SNAT data path in accordance with the techniques of the disclosure.

FIG. 18 is a block diagram illustrating an example of an SNAT data path in accordance with the techniques of the disclosure. The orchestrator may use XMPP to configure a gateway of a VM. The orchestrator may further configure a gateway of the datacenter via BGP.

Figure 19:
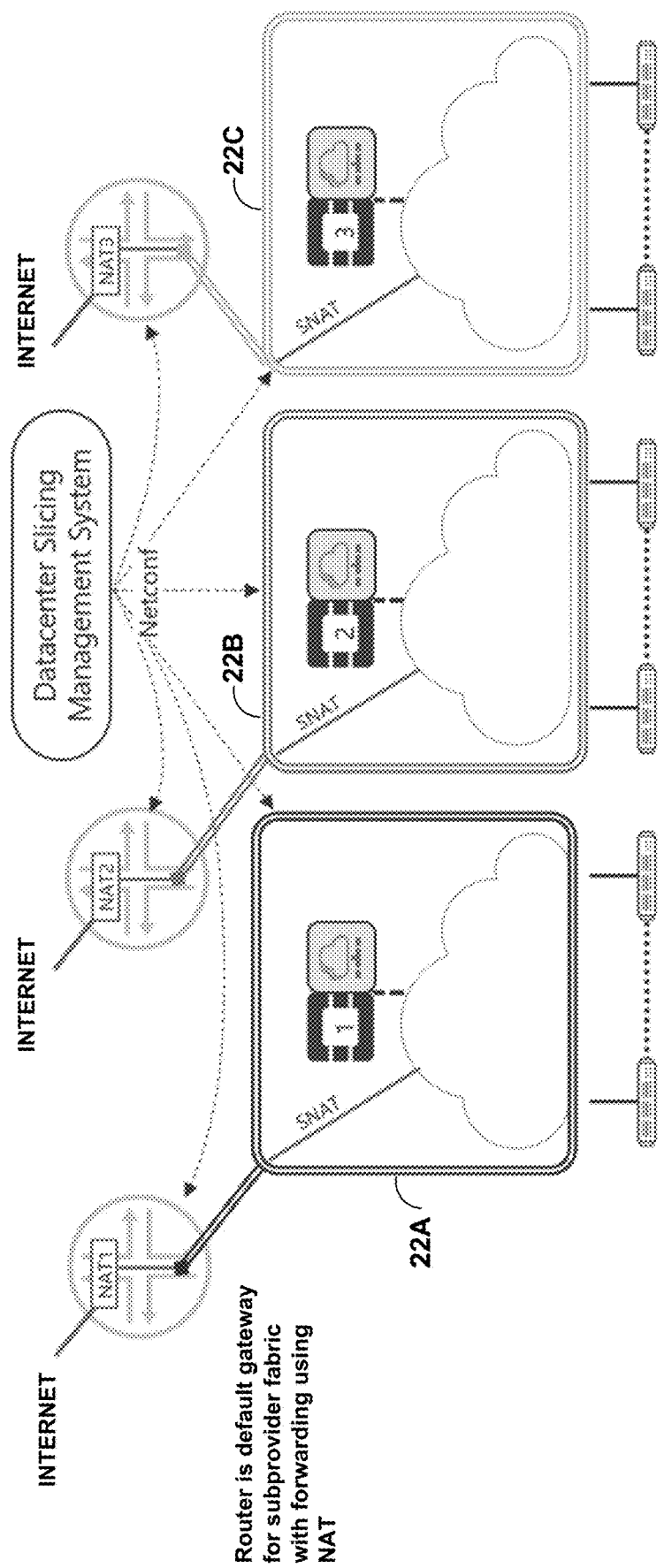
FIG. 19 is a block diagram illustrating an example of an SNAT gateway for sub-providers in overlapping sub-provider fabrics in accordance with the techniques of the disclosure

FIG. 19 is a block diagram illustrating an example of an SNAT gateway for sub-providers in overlapping sub-provider fabrics in accordance with the techniques of the disclosure. In the example of FIG. 19, the system uses a separate gateway for each subprovider. Further, each subprovider is allocated overlapping subprovider fabrics. The router is the default gateway for the subprovider fabric with forwarding using NAT.

Figure 20:
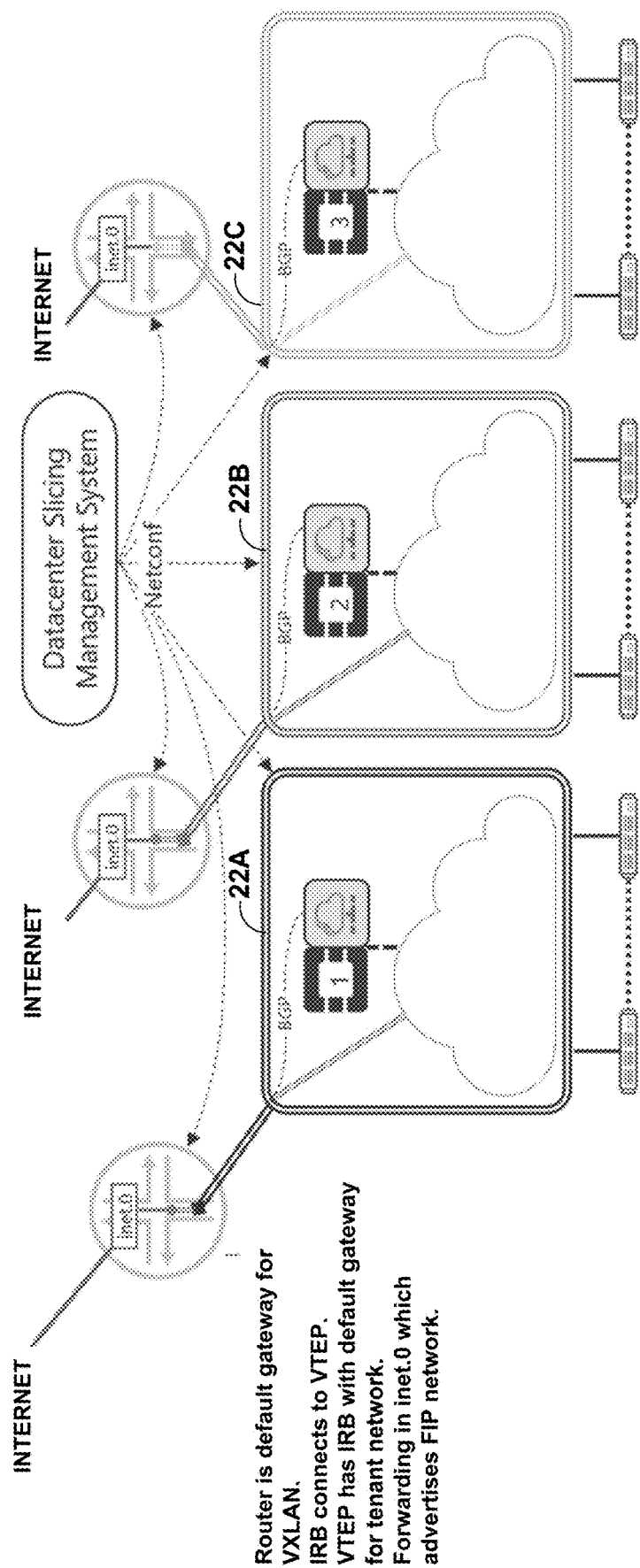
FIG. 20 is a block diagram illustrating an example use of FIP for sub-providers using non-overlapping FIP pools in accordance with the techniques of the disclosure.

FIG. 20 is a block diagram illustrating an example use of FIP for sub-providers using non-overlapping FIP pools in accordance with the techniques of the disclosure. In the example of FIG. 20, the system uses a separate gateway for each subprovider. Further, each subprovider is allocated non-overlapping FIP pools. The router is default gateway for the VXLAN. TRB connects to each VTEP. The VTEP has TRB with default gateway for tenant network. The system uses forwarding in inet.0 to advertise the FIP network.

Figure 21:
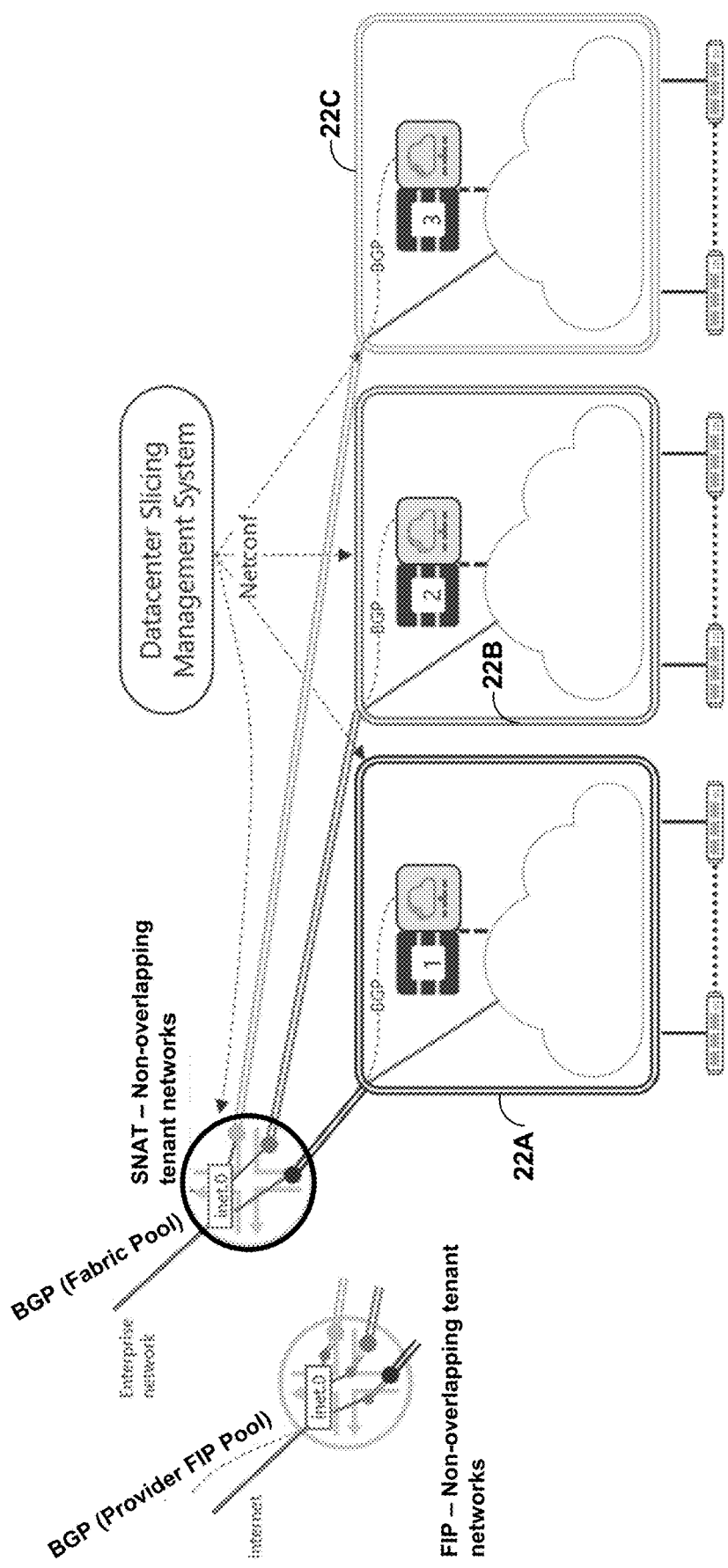
FIG. 21 is a block diagram illustrating an example of a shared gateway using SNAT for sub-providers in non-overlapping sub-provider fabrics and FIP with non-overlapping tenant networks.

FIG. 21 is a block diagram illustrating an example of a shared gateway using SNAT for sub-providers in non-overlapping sub-provider fabrics and FIP with non-overlapping tenant networks. SNAT may be used for non-overlapping subprovider fabrics. BGP may be used to communicate the fabric pool. FIP may be used for non-overlapping tenant networks. BGP may be used to communicate the provider FIP pool.

Figure 22:
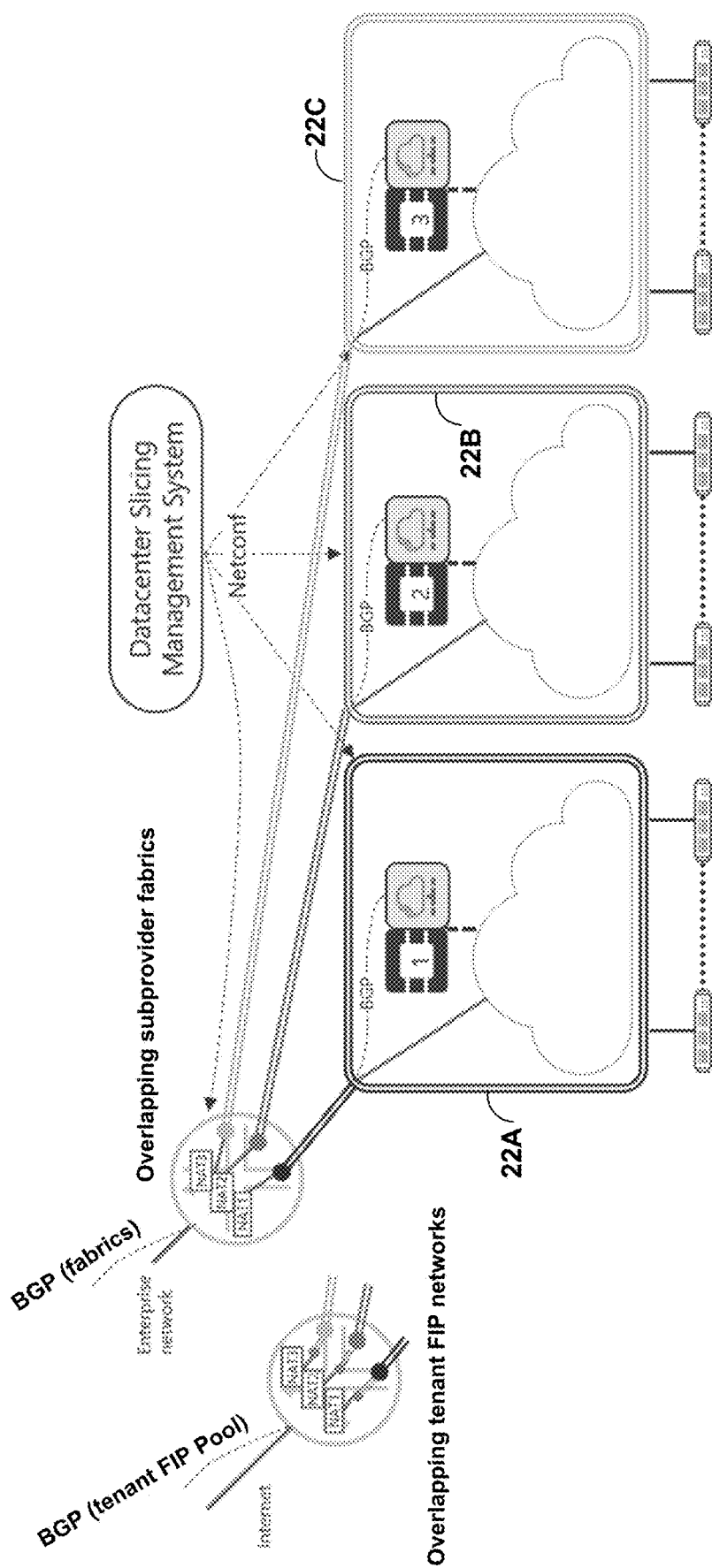
FIG. 22 is a block diagram illustrating an example of a shared gateway using SNAT for sub-providers in overlapping sub-provider fabrics and FIP with overlapping tenant networks.

FIG. 22 is a block diagram illustrating an example of a shared gateway using SNAT for sub-providers in overlapping sub-provider fabrics and FIP with overlapping tenant networks. SNAT may be used for overlapping subprovider fabrics. BGP may be used to communicate the fabric pool. FIP may be used for overlapping tenant FIP networks. BGP may be used to communicate the tenant FIP pools.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

The invention claimed is:

1. A method comprising:
configuring, by a controller for a virtualized computing infrastructure, a plurality of Virtual Extensible Local Area Network (VXLAN) segments in a switch fabric, thereby enabling orchestration of respective tenants in the plurality of VXLAN segments,
wherein each VXLAN segment of the plurality of VXLAN segments provides underlay network connectivity among a different subset of host computing devices of the virtualized computing infrastructure, and
wherein a plurality of overlay networks are configured in a first subset of the host computing devices having underlay network connectivity by operation of a first VXLAN segment of the plurality of VXLAN segments, thereby enabling orchestration of multiple subtenants of a first tenant in the first subset of the host computing devices; and
assigning, by the controller and to the first VXLAN segment, a plurality of floating IP (FIP) addresses for configuring overlay networks of the plurality of overlay networks configured in the first subset of the host computing devices.

2. The method of claim 1, further comprising assigning, by the controller and to each overlay network of the plurality of overlay networks configured in the first subset of the host computing devices, a different subset of the plurality of FIP addresses.

3. The method of claim 2, further comprising assigning, by the controller and to each virtual router of a plurality of virtual routers of a first overlay network of the plurality of overlay networks, a different FIP address of a first subset of the plurality of FIP addresses, the first subset assigned to the first overlay network.

4. The method of claim 1, wherein the plurality of FIP addresses comprises a first plurality of FIP addresses, the method further comprising:
assigning, by the controller and to a second VXLAN segment of the plurality of VXLAN segments, a second plurality of FIP addresses for configuring overlay networks of the plurality of overlay networks configured in a second subset of the host computing devices having underlay network connectivity by operation of the second VXLAN segment, wherein the second plurality of FIP addresses are different from the first plurality of FIP addresses.

5. The method of claim 1, wherein the plurality of FIP addresses comprises a first plurality of FIP addresses, the method further comprising:
assigning, by the controller and to a second VXLAN segment of the plurality of VXLAN segments, a second plurality of FIP addresses for configuring overlay networks of the plurality of overlay networks configured in a second subset of the host computing devices having underlay network connectivity by operation of the second VXLAN segment, wherein the second plurality of FIP addresses are the same as the first plurality of FIP addresses.

6. The method of claim 1, further comprising:
assigning, by the controller and to each VXLAN segment of the plurality of VXLAN segments, a different tenant of the respective tenants; and
controlling, by the controller, forwarding of network traffic for each tenant of the respective tenants to the corresponding VXLAN segment of the plurality of VXLAN segments to which the tenant is assigned.

7. The method of claim 1, further comprising:
assigning, by the controller and to each overlay network of the plurality of overlay networks in the first subset of the host computing devices, a different subtenant of the multiple subtenants of the first tenant; and
controlling, by the controller, forwarding of network traffic for each subtenant of the multiple subtenants of the first tenant to the corresponding overlay network of the plurality of overlay networks in the first subset of the host computing devices to which the subtenant is assigned.

8. The method of claim 1, further comprising provisioning, by the controller and for the first VXLAN segment, a Source Network Address Translation (SNAT) gateway between a VXLAN Tunnel Endpoint (VTEP) of the first VXLAN segment and the plurality of overlay networks of the first VXLAN segment.

9. The method of claim 8, wherein provisioning, for the first VXLAN segment, the SNAT gateway comprises provisioning, in a virtual router of the first subset of the host computing devices, the SNAT gateway.

10. The method of claim 1, further comprising configuring, for a first overlay network of the plurality of overlay networks in the first subset of the host computing devices, a plurality of virtual routers configured to process network traffic for a subtenant of the multiple subtenants that is assigned to the first overlay network.

11. A computing system comprising processing circuitry having access to a memory, the processing circuitry configured to execute a controller for a virtualized computing infrastructure, the controller configured to:
configure a plurality of Virtual Extensible Local Area Network (VXLAN) segments in a switch fabric, thereby enabling orchestration of respective tenants in the plurality of VXLAN segments,
wherein each VXLAN segment of the plurality of VXLAN segments provides underlay network connectivity among a different subset of host computing devices of the virtualized computing infrastructure, and
wherein a plurality of overlay networks are configured in a first subset of the host computing devices having underlay network connectivity by operation of a first VXLAN segment of the plurality of VXLAN segments, thereby enabling orchestration of multiple subtenants of a first tenant in the first subset of the host computing devices; and
assign, to the first VXLAN segment, a plurality of floating IP (FIP) addresses for configuring overlay networks of the plurality of overlay networks configured in the first subset of the host computing devices.

12. The computing system of claim 11, wherein the controller is further configured to assign, to each overlay network of the plurality of overlay networks configured in the first subset of the host computing devices, a different subset of the plurality of FIP addresses.

13. The computing system of claim 11, wherein the controller is further configured to assign, to each virtual router of a plurality of virtual routers of a first overlay network of the plurality of overlay networks, a different FIP address of a first subset of the plurality of FIP addresses, the first subset assigned to the first overlay network.

14. The computing system of claim 11, wherein the plurality of FIP addresses comprises a first plurality of FIP addresses, wherein the controller is further configured to:
assign, to a second VXLAN segment of the plurality of VXLAN segments, a second plurality of FIP addresses for configuring overlay networks of the plurality of overlay networks configured in a second subset of the host computing devices having underlay network connectivity by operation of the second VXLAN segment, wherein the second plurality of FIP addresses are different from the first plurality of FIP addresses.

15. The computing system of claim 11, wherein the plurality of FIP addresses comprises a first plurality of FIP addresses, wherein the controller is further configured to:
assign, to a second VXLAN segment of the plurality of VXLAN segments, a second plurality of FIP addresses for configuring overlay networks of the plurality of overlay networks configured in a second subset of the host computing devices having underlay network connectivity by operation of the second VXLAN segment, wherein the second plurality of FIP addresses are the same as the first plurality of FIP addresses.

16. The computing system of claim 11, wherein the controller is further configured to:
assign, to each VXLAN segment of the plurality of VXLAN segments, a different tenant of the respective tenants; and
control forwarding of network traffic for each tenant of the respective tenants to the corresponding VXLAN segment of the plurality of VXLAN segments to which the tenant is assigned.

17. The computing system of claim 11, wherein the controller is further configured to:
assign, to each overlay network of the plurality of overlay networks in the first subset of the host computing devices, a different subtenant of the multiple subtenants of the first tenant; and
control forwarding of network traffic for each subtenant of the multiple subtenants of the first tenant to the corresponding overlay network of the plurality of overlay networks in the first subset of the host computing devices to which the subtenant is assigned.

18. The computing system of claim 11, wherein the controller is further configured to provision, for the first VXLAN segment, a Source Network Address Translation (SNAT) gateway between a VXLAN Tunnel Endpoint (VTEP) of the first VXLAN segment and the plurality of overlay networks of the first VXLAN segment.

19. The computing system of claim 18, wherein, to provision, for the first VXLAN segment, the SNAT gateway, the controller is configured to provision, in a virtual router of the first subset of the host computing devices, the SNAT gateway.

20. Non-transitory, computer-readable media comprising instructions that, when executed, are configured to cause processing circuitry to:
configure a plurality of Virtual Extensible Local Area Network (VXLAN) segments in a switch fabric, thereby enabling orchestration of respective tenants in the plurality of VXLAN segments,
wherein each VXLAN segment of the plurality of VXLAN segments provides underlay network connectivity among a different subset of host computing devices of virtualized computing infrastructure, and
wherein a plurality of overlay networks are configured in a first subset of the host computing devices having underlay network connectivity by operation of a first VXLAN segment of the plurality of VXLAN segments, thereby enabling orchestration of multiple subtenants of a first tenant in the first subset of the host computing devices; and
assign, to the first VXLAN segment, a plurality of floating IP (FIP) addresses for configuring overlay networks of the plurality of overlay networks configured in the first subset of the host computing devices.

* * * * *